United States Patent
Qin

(10) Patent No.: US 10,764,002 B2
(45) Date of Patent: Sep. 1, 2020

(54) INFORMATION TRANSMISSION METHOD, RECEIVING DEVICE, SENDING DEVICE, AND SYSTEM

(71) Applicant: HUAWEI TECHNOLOGIES CO., LTD., Shenzhen, Guangdong (CN)

(72) Inventor: Yiping Qin, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 45 days.

(21) Appl. No.: 16/184,813

(22) Filed: Nov. 8, 2018

(65) Prior Publication Data

US 2019/0097767 A1 Mar. 28, 2019

Related U.S. Application Data

(63) Continuation of application No. PCT/CN2016/081417, filed on May 9, 2016.

(51) Int. Cl.
*H04L 1/18* (2006.01)
*H04L 1/00* (2006.01)

(52) U.S. Cl.
CPC .......... *H04L 1/1874* (2013.01); *H04L 1/0003* (2013.01); *H04L 1/0014* (2013.01);
(Continued)

(58) Field of Classification Search
CPC ... H04L 1/1874; H04L 1/1819; H04L 1/1864; H04L 1/1835; H04L 1/189; H04L 1/1812; H04L 1/0014; H04L 1/0003
See application file for complete search history.

(56) References Cited

U.S. PATENT DOCUMENTS

2005/0250454 A1* 11/2005 Sebire ............... H04L 1/1845
455/67.11
2006/0190796 A1* 8/2006 Hagiwara ........... H04L 1/0003
714/749

(Continued)

FOREIGN PATENT DOCUMENTS

| CN | 101990242 A | 3/2011 |
| CN | 102137504 A | 7/2011 |

(Continued)

OTHER PUBLICATIONS

R1-163232 Ericsson,"Performance study of existing turbo codes and LDPC codes",TSG-RAN WG1 #84bis,Busan, South Korea, Apr. 11-15, 2016,total 12 pages.

(Continued)

*Primary Examiner* — Thien Nguyen
(74) *Attorney, Agent, or Firm* — Westerman, Hattori, Daniels & Adrian, LLP

(57) ABSTRACT

Embodiments of the present disclosure disclose an information transmission method, a receiving device, a sending device, and a system. The method includes: receiving, by a receiving device, coded data of $i^{th}$ retransmission; obtaining a transmission count RvCnt(i) of the $i^{th}$ retransmission; determining a redundancy version Rv(i) of the $i^{th}$ retransmission based on the transmission count RvCnt(i) of the $i^{th}$ retransmission; combining the coded data of the $i^{th}$ retransmission into a virtual circular buffer of a data block based on the redundancy version Rv(i) of the $i^{th}$ retransmission; and performing decoding. The method may not be limited by a current quantity of redundancy versions. Therefore, a column starting position of coded data of each retransmission in the virtual circular buffer can be flexibly determined, and a requirement of a high transmission code rate is met.

16 Claims, 12 Drawing Sheets

(52) U.S. Cl.
CPC ............ *H04L 1/189* (2013.01); *H04L 1/1812* (2013.01); *H04L 1/1819* (2013.01); *H04L 1/1835* (2013.01); *H04L 1/1864* (2013.01)

(56) References Cited

U.S. PATENT DOCUMENTS

| | | | | |
|---|---|---|---|---|
| 2011/0078547 | A1* | 3/2011 | Spencer | H03M 13/2957 714/790 |
| 2012/0195398 | A1* | 8/2012 | Shen | H03M 13/2957 375/340 |
| 2013/0176981 | A1* | 7/2013 | Earnshaw | H04W 72/04 370/329 |
| 2014/0038665 | A1* | 2/2014 | Lin | H04L 1/1819 455/550.1 |
| 2015/0039958 | A1 | 2/2015 | Vos | |
| 2015/0349924 | A1* | 12/2015 | Wang | H04L 1/0061 714/807 |
| 2016/0173262 | A1* | 6/2016 | Davydov | H04B 7/0617 370/329 |
| 2017/0230149 | A1* | 8/2017 | Wang | H04L 1/0057 |
| 2018/0007709 | A1* | 1/2018 | Seo | H04L 1/00 |
| 2018/0034608 | A1* | 2/2018 | Seo | H04L 5/00 |
| 2018/0035409 | A1* | 2/2018 | Chmiel | H04L 1/1822 |
| 2018/0152924 | A1* | 5/2018 | Ouchi | H04W 72/0453 |

FOREIGN PATENT DOCUMENTS

| | | |
|---|---|---|
| CN | 102255710 A | 11/2011 |
| CN | 103378936 A | 10/2013 |
| EP | 2254366 A1 | 11/2010 |
| WO | 2009094805 A1 | 8/2009 |

OTHER PUBLICATIONS

R1-151588 Samsung, "Incremental Redundancy vs. Chase Combining for PDSCH Transmissions", 3GPP TSG RAN WG1 #80bis, Belgrade, Serbia, Apr. 20-24, 2015, total 3 pages.

* cited by examiner

US 10,764,002 B2

INFORMATION TRANSMISSION METHOD, RECEIVING DEVICE, SENDING DEVICE, AND SYSTEM

CROSS-REFERENCE TO RELATED APPLICATIONS

This application is a continuation of International Application No. PCT/CN2016/081417, filed on May 9, 2016, the disclosure of which is hereby incorporated by reference in its entirety.

TECHNICAL FIELD

Embodiments of the present disclosure relate to the communications field, and in particular, to an information transmission method, a receiving device, a sending device, and a system.

BACKGROUND

In a Long Term Evolution (LTE) system, uplink data is carried on a physical uplink shared channel (PUSCH), and downlink data is carried on a physical downlink shared channel (PDSCH). For both the PUSCH and the PDSCH, turbo coding with a mother code rate of 1/3 is used for channel coding. A sending device performs turbo coding with a code rate of 1/3 on sent data, and outputs three data streams. The three data streams are combined, and different code rates can be obtained through rate matching. When a hybrid automatic repeat request (HARQ) technology is used, the sending device places a coded data block in a virtual circular buffer of the data block, where the virtual circular buffer includes both information bits and parity bits. The sending device obtains coded data from the virtual circular buffer based on a code rate of each transmission and a column starting position of a coded data block, and sends the coded data to a receiving device. The receiving device places the received coded data in the virtual circular buffer for combining and decoding. A column starting position of the coded data of each transmission in the virtual circular buffer is indicated by a redundancy version used in each retransmission. Different redundancy versions indicate different column starting positions of coded data blocks of retransmission in the virtual circular buffer. In a current LTE protocol, four redundancy versions are used to indicate four different column starting positions. Because a code rate of initial transmission in the current protocol is generally less than 1.0, by using turbo decoding with a mother code rate of 1/3, the receiving device receives only a maximal of 1/3 of the virtual circular buffer each time. Theoretically, three redundancy versions, namely, three column starting positions, are sufficient to link up all information bits and parity bits.

If a size of a code block can be enhanced, that is, a code rate of single transmission is enhanced; the code block is transmitted for a plurality of times through HARQ; and a different redundancy version is selected for coded bits of each transmission, a coding gain and a time diversity gain can be obtained, to protect against fluctuation of the channel itself and interference, and reduce a throughput loss caused by modulation and coding scheme (MCS) selection inaccuracy.

However, when a code rate exceeds 1.0, fewer coded bits are transmitted each time, and a quantity of bits occupied between starting positions of the four redundancy versions exceeds a quantity of bits of each transmission. As a result, regardless of how to select a redundancy version, it cannot be ensured that all coded bits are traversed, and specifically when the information bits are not all sent, demodulation performance is affected. If a retransmission code rate needs to be improved, more starting positions need to be indicated in each retransmission correspondingly.

SUMMARY

In view of this, embodiments of the present disclosure provide an information transmission method, a receiving device, a sending device, and a system, so that the receiving device and the sending device can flexibly obtain a starting position of a virtual circular buffer in each retransmission as required, thereby supporting a higher code rate and improving system efficiency.

According to a first aspect, an embodiment of the present disclosure provides an information transmission method, where the method includes:

receiving, by a receiving device, coded data of $i^{th}$ retransmission of a data block, where i is an integer greater than 0;

obtaining, by the receiving device, a transmission count $RvCnt(i)$ of the $i^{th}$ retransmission;

determining, by the receiving device, a redundancy version $Rv(i)$ of the $i^{th}$ retransmission based on the transmission count $RvCnt(i)$ of the $i^{th}$ retransmission;

combining, by the receiving device, the coded data of the $i^{th}$ retransmission into a virtual circular buffer of the data block based on the redundancy version $Rv(i)$ of the $i^{th}$ retransmission; and decoding, by the receiving device, coded data in the virtual circular buffer of the data block.

With reference to the first aspect, in a first possible implementation, if the receiving device is a base station, the base station obtains the transmission count $RvCnt(i)$ of the $i^{th}$ retransmission in the following manner:

$$RvCnt(i)=RvCnt(i-1)+1; \text{ or}$$

$$RvCnt(i)=RvCnt(i-1)+b+c_{offset},$$

where b is an integer ranging from 0 to 3, and a value of $c_{offset}$ is −2, −1, or 0.

With reference to the first possible implementation of the first aspect, in a second possible implementation, the base station further sends scheduling information to a terminal, where the scheduling information includes an information bit of the transmission count $RvCnt(i)$ of the $i^{th}$ retransmission.

With reference to the first aspect, in a third possible implementation, if the receiving device is a terminal, the terminal obtains the transmission count $RvCnt(i)$ of the $i^{th}$ retransmission based on $RvCnt(i)=RvCnt(i-1)+1$; or the terminal receives scheduling information sent by a base station, the terminal obtains an information bit of the transmission count $RvCnt(i)$ of the $i^{th}$ retransmission from the scheduling information, and the terminal obtains the transmission count $RvCnt(i)$ of the $i^{th}$ retransmission based on the information bit of the transmission count $RvCnt(i)$ of the $i^{th}$ retransmission.

With reference to the second or the third possible implementation of the first aspect, in a fourth possible implementation, a new field may be added to the scheduling information to send the information bit of the transmission count $RvCnt(i)$ of the $i^{th}$ retransmission; or an MCS field in the scheduling information may be reused to send the information bit of the transmission count $RvCnt(i)$ of the $i^{th}$ retransmission; or a redundancy version field in the scheduling information may be used to send the information bit of the transmission count RvCnt(i) of the $i^{th}$ retransmission.

With reference to any one of the first aspect or the first to the fourth possible implementations of the first aspect, in a fifth possible implementation, the receiving device determines the redundancy version Rv(i) of the $i^{th}$ retransmission in any one of the following manners:

$$Rv(i)=(Rv(i-1)+\text{round}((RvCnt(i)-RvCnt(i-1))\cdot 1/(Rate(i-1)\cdot 3.0)\cdot N_{rv})\% N_{rv})\% N_{rv}; \text{ or}$$

$$Rv(i)=(Rv(i-1)+\lfloor(RvCnt(i)-RvCnt(i-1))\cdot 1/(Rate(i-1)\cdot 3.0)\cdot N_{rv}\rfloor\% N_{rv})\% N_{rv}; \text{ or}$$

$$Rv(i)=(Rv(i-1)+\lceil(RvCnt(i)-RvCnt(i-1))\cdot 1/(Rate(i-1)\cdot 3.0)\cdot N_{rv}\rceil\% N_{rv})\% N_{rv}, \text{ where}$$

if i=1, Rv(0) is a redundancy version of initial transmission of the data block, RvCnt(0) is a transmission count of the initial transmission, and is initially 0, and Rate(0) is a transmission code rate of the initial transmission; or if i>1, Rv(i−1) is a redundancy version of $(i-1)^{th}$ retransmission, RvCnt(i−1) is a transmission count of the $(i-1)^{th}$ retransmission, and Rate(i−1) is a transmission code rate of the $(i-1)^{th}$ retransmission; and $N_{rv}$ is a quantity of redundancy versions; round(•) represents rounding off; % represents performing modulo operation; $\lceil \cdot \rceil$ represents rounding up; and $\lfloor \cdot \rfloor$ represents rounding down.

With reference to the fifth possible implementation of the first aspect, in a sixth possible implementation, the receiving device determines a starting position $k_0(i)$ of the coded data of the $i^{th}$ retransmission in the virtual circular buffer of the data block based on the following formula:

$$k_0(i)=R_{subblock}^{TC}\cdot((2\cdot\lceil N_{cb}/(2\cdot N_{rv}\cdot R_{subblock}^{TC})\rceil\cdot Rv(i)+a)\%(3\cdot C_{subblock}^{TC}); \text{ and}$$

the receiving device combines the coded data of the $i^{th}$ retransmission into the virtual circular buffer of the data block based on $k_0(i)$, where $R_{subblock}^{TC}$ is a quantity of rows of a coded data block in the virtual circular buffer of the data block; $N_{cb}$ is a quantity of bits of the coded data block in the virtual circular buffer of the data block; $C_{subblock}^{TC}$ equals 32, and is a quantity of columns of the coded data block in the virtual circular buffer of the data block; $N_{rv}$ is the quantity of redundancy versions and ranges from 4 to $3\cdot C_{subblock}^{TC}$; a is an offset ranging from 0 to $C_{subblock}^{TC}-1$% represents performing modulo operation; and $\lceil \cdot \rceil$ represents rounding up.

According to a second aspect, an embodiment of the present disclosure provides an information transmission method, where the method includes:

obtaining, by a sending device, a transmission count RvCnt(i) of $i^{th}$ retransmission, where i is an integer greater than 0;

determining, by the sending device, a redundancy version Rv(i) of the $i^{th}$ retransmission based on the transmission count RvCnt(i) of the $i^{th}$ retransmission;

obtaining, by the sending device, coded data of the $i^{th}$ retransmission from a virtual circular buffer of a data block based on the redundancy version Rv(i) of the $i^{th}$ retransmission; and sending, by the sending device, the coded data of the $i^{th}$ retransmission to a receiving device.

With reference to the second aspect, in a first possible implementation, if the sending device is a terminal, the terminal obtains the transmission count RvCnt(i) of the $i^{th}$ retransmission based on RvCnt(i)=RvCnt(i−1)+1; or the terminal receives scheduling information sent by a base station, the terminal obtains an information bit of the transmission count RvCnt(i) of the $i^{th}$ retransmission from the scheduling information, and the terminal obtains the transmission count RvCnt(i) of the $i^{th}$ retransmission based on the information bit of the transmission count RvCnt(i) of the $i^{th}$ retransmission.

With reference to the second aspect, in a second possible implementation, if the sending device is a base station, the base station obtains the transmission count RvCnt(i) of the $i^{th}$ retransmission in the following manner:

$$RvCnt(i)=RvCnt(i-1)+1; \text{ or}$$

$$RvCnt(i)=RvCnt(i-1)+b+c_{offset},$$

where b is an integer ranging from 0 to 3, and a value of $c_{offset}$ is −2, −1, or 0.

With reference to the second possible implementation of the second aspect, in a third possible implementation, after obtaining the transmission count RvCnt(i) of the $i^{th}$ retransmission, the base station sends scheduling information to a terminal, where the scheduling information includes an information bit of the transmission count RvCnt(i) of the $i^{th}$ retransmission.

With reference to the first possible implementation or the third possible implementation of the second aspect, in a fourth possible implementation, a new field may be added to the scheduling information to send the information bit of the transmission count RvCnt(i) of the $i^{th}$ retransmission; or an MCS field in the scheduling information may be reused to send the information bit of the transmission count RvCnt(i) of the $i^{th}$ retransmission; or a redundancy version field in the scheduling information may be used to send the information bit of the transmission count RvCnt(i) of the $i^{th}$ retransmission.

With reference to any one of the second aspect or the first to the fourth possible implementations of the second aspect, in a fifth possible implementation, the sending device determines the redundancy version Rv(i) of the $i^{th}$ retransmission in any one of the following manners:

$$Rv(i)=(Rv(i-1)+\text{round}((RvCnt(i)-RvCnt(i-1))\cdot 1/(Rate(i-1)\cdot 3.0)\cdot N_{rv})\% N_{rv})\% N_{rv}; \text{ or}$$

$$Rv(i)=(Rv(i-1)+\lfloor(RvCnt(i)-RvCnt(i-1))\cdot 1/(Rate(i-1)\cdot 3.0)\cdot N_{rv}\rfloor\% N_{rv})\% N_{rv}; \text{ or}$$

$$Rv(i)=(Rv(i-1)+\lceil(RvCnt(i)-RvCnt(i-1))\cdot 1/(Rate(i-1)\cdot 3.0)\cdot N_{rv}\rceil\% N_{rv})\% N_{rv}, \text{ where}$$

if i=1, Rv(0) is a redundancy version of initial transmission of the data block, RvCnt(0) is a transmission count of the initial transmission, and is initially 0, and Rate(0) is a transmission code rate of the initial transmission; or if i>1, Rv(i−1) is a redundancy version of $(i-1)^{th}$ retransmission, RvCnt(i−1) is a transmission count of the $(i-1)^{th}$ retransmission, and Rate(i−1) is a transmission code rate of the $(i-1)^{th}$ retransmission; and $N_{rv}$ is a quantity of redundancy versions; round(•) represents rounding off; % represents performing modulo operation; $\lceil \cdot \rceil$ represents rounding up; and $\lfloor \cdot \rfloor$ represents rounding down.

With reference to any one of the second aspect or the first to the fifth possible implementations of the second aspect, in a sixth possible implementation, the sending device determines a starting position $k_0(i)$ of the coded data of the $i^{th}$ retransmission in the virtual circular buffer of the data block based on the following formula:

$$k_0(i)=R_{subblock}^{TC}\cdot((2\cdot\lceil N_{cb}/(2\cdot N_{rv}\cdot R_{subblock}^{TC})\rceil\cdot Rv(i)+a)\%(3\cdot C_{subblock}^{TC}); \text{ and}$$

the sending device obtains the coded data of the $i^{th}$ retransmission from the circular buffer of the data block based on $k_0(i)$, where $R_{subblock}^{TC}$ is a quantity of rows of a coded data block in the virtual circular buffer of the data block; $N_{cb}$ is a quantity of bits of the coded data block in the virtual circular buffer of the data block; $C_{subblock}^{TC}$ equals 32, and is a quantity of columns of the coded data block in the virtual circular buffer of the data block; $N_{rv}$ is the quantity of redundancy versions and ranges from 4 to $3 \cdot C_{subblock}^{TC}$; a is an offset ranging from 0 to $C_{subblock}^{TC}-1$; % represents performing modulo operation; and $\lceil \cdot \rceil$ represents rounding up.

According to a third aspect, a receiving device is provided, including a transceiver unit, an obtaining unit, a determining unit, a combining unit, and a decoding unit, where the transceiver unit is configured to receive coded data of $i^{th}$ retransmission of a data block, where i is an integer greater than 0;

the obtaining unit is configured to obtain a transmission count RvCnt(i) of the $i^{th}$ retransmission;

the determining unit is configured to determine a redundancy version Rv(i) of the $i^{th}$ retransmission based on the transmission count RvCnt(i) of the $i^{th}$ retransmission obtained by the obtaining unit;

the combining unit is configured to combine the coded data of the $i^{th}$ retransmission into a virtual circular buffer of the data block based on the redundancy version Rv(i) of the $i^{th}$ retransmission determined by the determining unit; and the decoding unit is configured to decode the virtual circular buffer of the data block.

With reference to the third aspect, in a first possible implementation, if the receiving device is a base station, the obtaining unit obtains the transmission count RvCnt(i) of the $i^{th}$ retransmission in the following manner:

RvCnt(i)=RvCnt(i-1)+1; or

RvCnt(i)=RvCnt(i-1)+b+$c_{offset}$, where b is an integer ranging from 0 to 3, and a value of $c_{offset}$ is -2, -1, or 0.

With reference to the first possible implementation of the third aspect, in a second possible implementation, the transceiver unit is further configured to send scheduling information to a terminal, where the scheduling information includes an information bit of the transmission count RvCnt(i) of the $i^{th}$ retransmission.

With reference to the third aspect, in a third possible implementation, if the receiving device is a terminal, the obtaining unit obtains the transmission count RvCnt(i) of the $i^{th}$ retransmission based on RvCnt(i)=RvCnt(i-1)+1; or the transceiver unit is further configured to receive scheduling information sent by a base station, and the obtaining unit is specifically configured to obtain an information bit of the transmission count RvCnt(i) of the $i^{th}$ retransmission from the scheduling information, and obtain the transmission count RvCnt(i) of the $i^{th}$ retransmission based on the information bit of the transmission count RvCnt(i) of the $i^{th}$ retransmission.

With reference to the second or the third possible implementation of the third aspect, in a fourth possible implementation, a new field may be added to the scheduling information to send the information bit of the transmission count RvCnt(i) of the $i^{th}$ retransmission; or an MCS field in the scheduling information may be reused to send the information bit of the transmission count RvCnt(i) of the $i^{th}$ retransmission; or a redundancy version field in the scheduling information may be used to send the information bit of the transmission count RvCnt(i) of the $i^{th}$ retransmission.

With reference to any one of the third aspect or the first to the fourth possible implementations of the third aspect, in a fifth possible implementation, the determining unit determines the redundancy version Rv(i) of the $i^{th}$ retransmission in any one of the following manners:

$$Rv(i)=(Rv(i-1)+\text{round}((RvCnt(i)-RvCnt(i-1))\cdot 1/(Rate(i-1)\cdot 3.0)\cdot N_{rv})\% N_{rv})\% N_{rv}; \text{ or}$$

$$Rv(i)=(Rv(i-1)+\lfloor(RvCnt(i)-RvCnt(i-1))\cdot 1/(Rate(i-1)\cdot 3.0)\cdot N_{rv}\rfloor\% N_{rv})\% N_{rv}; \text{ or}$$

$$Rv(i)=(Rv(i-1)+\lceil(RvCnt(i)-RvCnt(i-1))\cdot 1/(Rate(i-1)\cdot 3.0)\cdot N_{rv}\rceil\% N_{rv})\% N_{rv}, \text{ where}$$

if i=1, Rv(0) is a redundancy version of initial transmission of the data block, RvCnt(0) is a transmission count of the initial transmission, and is initially 0, and Rate(0) is a transmission code rate of the initial transmission; or if i>1, Rv(i-1) is a redundancy version of $(i-1)^{th}$ retransmission, RvCnt(i-1) is a transmission count of the $(i-1)^{th}$ retransmission, and Rate(i-1) is a transmission code rate of the $(i-1)^{th}$ retransmission; and $N_{rv}$ is a quantity of redundancy versions; round($\cdot$) represents rounding off; % represents performing modulo operation; $\lceil \cdot \rceil$ represents rounding up; and $\lfloor \cdot \rfloor$ represents rounding down.

With reference to the fifth possible implementation of the third aspect, in a sixth possible implementation, the combining unit is specifically configured to determine a starting position $k_0(i)$ of the coded data of the $i^{th}$ retransmission in the virtual circular buffer of the data block based on the following formula:

$$k_0(i)=R_{subblock}^{TC} \cdot ((2 \cdot \lceil N_{cb}/(2 \cdot N_{rv} \cdot R_{subblock}^{TC})\rceil \cdot Rv(i)+a)\%(3 \cdot C_{subblock}^{TC}); \text{ and}$$

combine the coded data of the $i^{th}$ retransmission into the virtual circular buffer of the data block based on $k_0(i)$, where $R_{subblock}^{TC}$ is a quantity of rows of a coded data block in the virtual circular buffer of the data block; $N_{cb}$ is a quantity of bits of the coded data block in the virtual circular buffer of the data block; $C_{subblock}^{TC}$ equals 32, and is a quantity of columns of the coded data block in the virtual circular buffer of the data block; $N_{rv}$ is the quantity of redundancy versions and ranges from 4 to $3 \cdot C_{subblock}^{TC}$; a is an offset ranging from 0 to $C_{subblock}^{TC}-1$; % represents performing modulo operation; and $\lceil \cdot \rceil$ represents rounding up.

According to a fourth aspect, an embodiment of the present disclosure provides a sending device, including an obtaining unit, a determining unit, and a transceiver unit, where the obtaining unit is configured to obtain a transmission count RvCnt(i) of $i^{th}$ retransmission, where i is an integer greater than 0;

the determining unit is configured to determine a redundancy version Rv(i) of the $i^{th}$ retransmission based on the transmission count RvCnt(i) of the $i^{th}$ retransmission; and the transceiver unit is configured to obtain coded data of the $i^{th}$ retransmission from a virtual circular buffer of a data block based on the redundancy version Rv(i) of the $i^{th}$ retransmission, and send the coded data of the $i^{th}$ retransmission to a receiving device.

With reference to the fourth aspect, in a first possible implementation, if the sending device is a terminal, the obtaining unit is specifically configured to obtain the transmission count RvCnt(i) of the i$^{th}$ retransmission based on RvCnt(i)=RvCnt(i−1)+1; or the transceiver unit is further configured to receive scheduling information sent by a base station, and the obtaining unit is specifically configured to obtain an information bit of the transmission count RvCnt(i) of the i$^{th}$ retransmission from the scheduling information, and obtain the transmission count RvCnt(i) of the i$^{th}$ retransmission based on the information bit of the transmission count RvCnt(i) of the i$^{th}$ retransmission.

With reference to the fourth aspect, in a second possible implementation, if the sending device is a base station, the obtaining unit is specifically configured to obtain the transmission count RvCnt(i) of the i$^{th}$ retransmission in the following manner:

$$\text{RvCnt}(i)=\text{RvCnt}(i-1)+1;\text{ or}$$

$$\text{RvCnt}(i)=\text{RvCnt}(i-1)+b+c_{\mathit{offset}},$$

where b is an integer ranging from 0 to 3, and a value of $c_{\mathit{offset}}$ is −2, −1, or 0.

With reference to the second possible implementation of the fourth aspect, in a third possible implementation, the transceiver unit is further configured to send scheduling information to a terminal, where the scheduling information includes an information bit of the transmission count RvCnt (i) of the i$^{th}$ retransmission.

With reference to the first possible implementation or the third possible implementation of the fourth aspect, in a fourth possible implementation, a new field may be added to the scheduling information to send the information bit of the transmission count RvCnt(i) of the i$^{th}$ retransmission; or an MCS field in the scheduling information may be reused to send the information bit of the transmission count RvCnt(i) of the i$^{th}$ retransmission; or a redundancy version field in the scheduling information may be used to send the information bit of the transmission count RvCnt(i) of the i$^{th}$ retransmission.

With reference to any one of the fourth aspect or the first to the fourth possible implementations of the fourth aspect, in a fifth possible implementation, the determining unit determines the redundancy version Rv(i) of the i$^{th}$ retransmission in any one of the following manners:

$$\text{Rv}(i)=(\text{Rv}(i-1)+\text{round}((\text{RvCnt}(i)-\text{RvCnt}(i-1))\cdot 1/(\text{Rate}(i-1)\cdot 3.0)\cdot N_{rv})\% N_{rv})\% N_{rv};\text{ or}$$

$$\text{Rv}(i)=(\text{Rv}(i-1)+\lfloor(\text{RvCnt}(i)-\text{RvCnt}(i-1))\cdot 1/(\text{Rate}(i-1)\cdot 3.0)\cdot N_{rv}\rfloor\% N_{rv})\% N_{rv};\text{ or}$$

$$\text{Rv}(i)=(\text{Rv}(i-1)+\lceil(\text{RvCnt}(i)-\text{RvCnt}(i-1))\cdot 1/(\text{Rate}(i-1)\cdot 3.0)\cdot N_{rv}\rceil\% N_{rv})\% N_{rv},\text{ where}$$

if i=1, Rv(0) is a redundancy version of initial transmission of the data block, RvCnt(0) is a transmission count of the initial transmission, and is initially 0, and Rate(0) is a transmission code rate of the initial transmission; or if i>1, Rv(i−1) is a redundancy version of (i−1)$^{th}$ retransmission, RvCnt(i−1) is a transmission count of the (i−1)$^{th}$ retransmission, and Rate(i−1) is a transmission code rate of the (i−1)$^{th}$ retransmission; and $N_{rv}$ is a quantity of redundancy versions; round(•) represents rounding off; % represents performing modulo operation; ⌈•⌉ represents rounding up; and ⌊•⌋ represents rounding down.

With reference to any one of the fourth aspect or the first to the fifth possible implementations of the fourth aspect, in a sixth possible implementation, the transceiver unit determines a starting position $k_0(i)$ of the coded data of the i$^{th}$ retransmission in the virtual circular buffer of the data block based on the following formula:

$$k_0(i)=R_{subblock}^{TC}\cdot((2\cdot\lceil N_{cb}/(2\cdot N_{rv}\cdot R_{subblock}^{TC})\rceil\cdot\text{Rv}(i)+a)\%(3\cdot C_{subblock}^{TC});\text{ and}$$

obtains the coded data of the i$^{th}$ retransmission from the circular buffer of the data block based on $k_0(i)$, and sends the coded data of the i$^{th}$ retransmission, where $R_{subblock}^{TC}$ is a quantity of rows of a coded data block in the virtual circular buffer of the data block; $N_{cb}$ is a quantity of bits of the coded data block in the virtual circular buffer of the data block; $C_{subblock}^{TC}$ equals 32, and is a quantity of columns of the coded data block in the virtual circular buffer of the data block; $N_{rv}$ is the quantity of redundancy versions and ranges from 4 to $3\cdot C_{subblock}^{TC}$; a is an offset ranging from 0 to $C_{subblock}^{TC}-1$; % represents performing modulo operation; and ⌈•⌉ represents rounding up.

According to a fifth aspect, an information transmission system is provided, including at least one receiving device of the third aspect or any one possible implementation of the third aspect, and at least one sending device of the fourth aspect or any one possible implementation of the fourth aspect.

According to the method, the receiving device, the sending device, and the system in the embodiments of the present disclosure, the receiving device and the sending device maintain a transmission count of each retransmission, and determine a redundancy version of the retransmission by using the transmission count, so that the redundancy version may not be limited by a quantity of redundancy versions in the prior art. Therefore, a column starting position of coded data of each retransmission in the virtual circular buffer can be flexibly determined, and a requirement of a high transmission code rate is met.

DESCRIPTION OF EMBODIMENTS

The following clearly describes the technical solutions in the embodiments of the present disclosure with reference to the accompanying drawings in the embodiments of the present disclosure. It may be understood that the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

A sending device and a receiving device in the embodiments of the present disclosure may be a wireless communications device, such as a base station or a terminal, that needs to perform data transmission in a wireless transmission manner.

A method, the receiving device, the sending device, and a system in the embodiments of the present disclosure may be implemented by using a wireless communications device, such as a radio access network device and a terminal, that needs to perform data transmission in a wireless transmission manner. The radio access network device includes but is not limited to, such as, an evolved NodeB (eNodeB), a NodeB, a radio network controller (RNC) or an access control node of another access network device. It should be noted that the embodiments of the present disclosure are not limited thereto.

In the embodiments of the present disclosure, the receiving device may be a radio access network device, such as a base station, and correspondingly, the sending device may be a terminal; or the receiving device may be a terminal, and correspondingly, the sending device may be a radio access network device, such as a base station. The embodiments of the present disclosure are not limited thereto.

In an LTE system, a redundancy version is transmitted between the receiving device and the sending device generally in three manners.

For non-adaptive retransmission, the terminal and the base station circularly send and combine data based on an agreed redundancy version sequence 0, 2, 3, and 1. A redundancy version of initial transmission is 0 by default. For the non-adaptive retransmission, the base station does not need to explicitly send notification information to the terminal, so that burden of control signaling can be reduced, but a transmitted redundancy version cannot be dynamically modified.

For PUSCH adaptive retransmission, the base station includes redundancy version information into an uplink MCS field during retransmission scheduling. For example, as shown in Table 1, selecting one of redundancy versions 1, 2, and 3 is achieved by selecting one of MCS 29 to MCS 31 accordingly, and selecting a redundancy version 0 is achieved by selecting one of MCS 0 to MCS 28.

For PDSCH adaptive retransmission, the base station notifies of redundancy version information by using a 2-bit redundancy version field in scheduling information.

Figure 1:
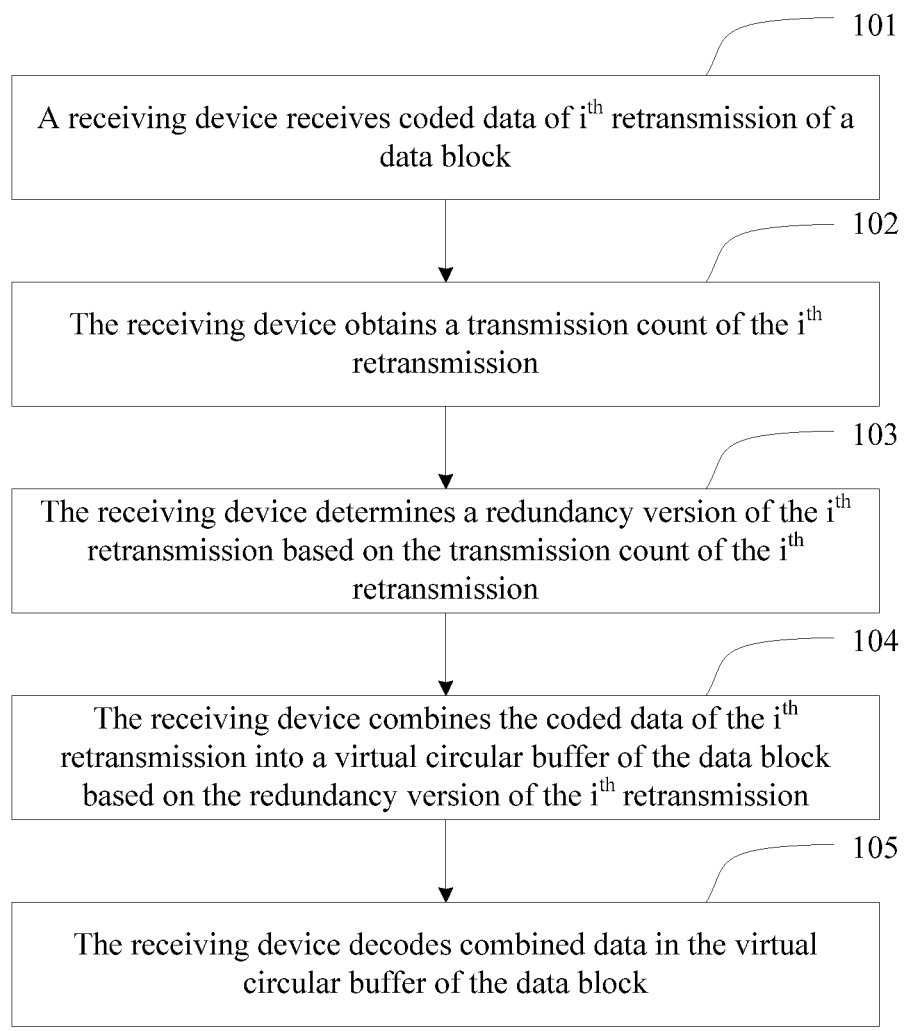
FIG. 1 is a flowchart of an information transmission method according to an embodiment of the present disclosure.

FIG. 1 is a flowchart of an information transmission method according to an embodiment of the present disclosure. As shown in FIG. 1, the method includes the following steps.

101. A receiving device receives coded data of $i^{th}$ retransmission of a data block, where i is an integer greater than 0, and an upper limit of i is a maximum quantity of retransmission times.

During initial transmission of each data block, a HARQ process is started between the receiving device and a sending device, to process initial transmission and retransmission of the coded data block of the data block. To increase a system throughput, a plurality of HARQ processes may be simultaneously started between the receiving device and the sending device, and a data block of each HARQ process is transmitted in parallel.

During initial transmission or each retransmission, the sending device obtains coded data from a virtual circular buffer of the data block based on a column starting position and a code rate of each transmission, and sends the coded data. For any HARQ process, the receiving device receives the coded data and then performs demodulation, performs HARQ combination on demodulated soft bits, combines and adds up historical soft bits and the soft bits received in this time, performs decoding, and corrects a decoding error by using a forward error correction (FEC) code. If the receiving device correctly performs decoding or corrects a decoding error through FEC, the receiving device sends an acknowledgment (ACK) to the sending device, to feed back that decoding is correct, the sending device no longer performs retransmission, and a corresponding HARQ process ends. If the receiving device determines, through error detection, that an error cannot be corrected, the receiving device sends a negative acknowledgment (NACK) to the sending device, to feed back that decoding is incorrect and request the sending device to perform retransmission, and the receiving device receives retransmitted coded data, and then performs combining and decoding, until decoding is correct or the maximum quantity of retransmission times is reached.

When i=1, the receiving device receives coded data of the initial transmission and then incorrectly decodes the coded data, sends a NACK to the sending device, and receives coded data of first retransmission; or when i>1, the receiving device receives coded data of $(i-1)^{th}$ retransmission and then incorrectly decodes the coded data, sends a NACK to the sending device, and receives the coded data of the $i^{th}$ retransmission.

102. The receiving device obtains a transmission count RvCnt(i) of the $i^{th}$ retransmission.

The receiving device and the sending device separately maintain a transmission count for each HARQ process. For the $i^{th}$ retransmission, the receiving device obtains the transmission count RvCnt(i) of the $i^{th}$ retransmission. For the initial transmission, a transmission count RvCnt(0) is 0.

In an embodiment of the present disclosure, the receiving device and the sending device may separately maintain a transmission count of a HARQ process according to an agreed rule. For example, the receiving device and the sending device may separately obtain the transmission count RvCnt(i) of the $i^{th}$ retransmission based on RvCnt(i)=RvCnt(i−1)+1. It should be noted that the present disclosure is not limited thereto. The receiving device and the sending device may alternatively agree on another rule to obtain the transmission count RvCnt(i) of the $i^{th}$ retransmission. In this manner, the receiving device and the sending device do not need to exchange the transmission count by using a message, so that an air interface transmission resource can be saved.

In another embodiment of the present disclosure, one end that schedules data may determine the transmission count RvCnt(i) of the $i^{th}$ retransmission, and notify the other end by using scheduling information. For example, when the receiving device is a base station, the base station may determine the transmission count RvCnt(i) of the $i^{th}$ retransmission based on RvCnt(i)=RvCnt(i−1)+b+$c_{offset}$, and notify a terminal of the transmission count of the $i^{th}$ retransmission by using scheduling information. A value of $c_{offset}$ is −2, −1, or 0, and $c_{offset}$ is pre-configured by a system; b is an integer ranging from 0 to 3, and a value of b may be determined by the base station during each retransmission, to ensure that RvCnt(i) is not a negative number. In this manner, b+$c_{offset}$ actually represents an increment of RvCnt(i), and may be a positive number or a negative number. When b+$c_{offset}$ is a negative number, b+$c_{offset}$ represents that a previous transmission count is retransmitted, so that an objective of flexible control is achieved. For another example, when the receiving device is a terminal, the terminal may obtain the transmission count RvCnt(i) of the $i^{th}$ retransmission by using scheduling information. In the foregoing manner, to reduce a data volume of air interface transmission, only an information bit, such as latter two bits, of RvCnt(i) may be transmitted by using the scheduling information. After obtaining the information bit of RvCnt(i), the terminal obtains the transmission count RvCnt(i) of the $i^{th}$ retransmission through recovery based on the information bit of RvCnt(i). Because the information bit of RvCnt(i) is in a relatively small quantity, a new field may be added to the scheduling information to send the information bit, or an MCS field may be reused to send the information bit, or a redundancy version field may be used to send the information bit. It should be noted that the foregoing is merely examples, and the present disclosure is not limited thereto.

103. The receiving device determines a redundancy version Rv(i) of the $i^{th}$ retransmission based on the transmission count RvCnt(i) of the $i^{th}$ retransmission obtained in step 102.

In an embodiment of the present disclosure, the receiving device may obtain the redundancy version Rv(i) of the $i^{th}$ retransmission in a plurality of manners, for example, may obtain the redundancy version Rv(i) of the $i^{th}$ retransmission through calculation by using any one of the following formulas:

$$Rv(i)=(Rv(i-1)+\text{round}((RvCnt(i)-RvCnt(i-1))\cdot 1/(Rate(i-1)\cdot 3.0)\cdot N_{rv})\% N_{rv})\% N_{rv}; \text{ or}$$

$$Rv(i)=(Rv(i-1)+\lfloor(RvCnt(i)-RvCnt(i-1))\cdot 1/(Rate(i-1)\cdot 3.0)\cdot N_{rv}\rfloor\% N_{rv})\% N_{rv}; \text{ or}$$

$$Rv(i)=(Rv(i-1)+\lceil(RvCnt(i)-RvCnt(i-1))\cdot 1/(Rate(i-1)\cdot 3.0)\cdot N_{rv}\rceil\% N_{rv})\% N_{rv}, \text{ where}$$

if i=1, Rv(i−1) is a redundancy version of the initial transmission of the data block, RvCnt(i−1) is the transmission count of the initial transmission, and is initially 0, and Rate(i−1) is a transmission code rate of the initial transmission; or if i>1, Rv(i−1) is a redundancy version of $(i-1)^{th}$ retransmission, RvCnt(i−1) is a transmission count of the $(i-1)^{th}$ retransmission, and Rate(i−1) is a transmission code rate of the $(i-1)^{th}$ retransmission; and $N_{rv}$ is a quantity of redundancy versions; round(•) represents rounding off; % represents performing modulo operation; $\lceil$•$\rceil$ represents rounding up; and $\lfloor$•$\rfloor$ represents rounding down.

It should be noted that the foregoing is merely examples, and the present disclosure is not limited thereto.

104. The receiving device combines the coded data of the $i^{th}$ retransmission into a virtual circular buffer of the data block based on the redundancy version Rv(i) of the $i^{th}$ retransmission determined in step 103.

The receiving device may determine a starting position $k_0(i)$ of the coded data of the $i^{th}$ retransmission in the virtual circular buffer of the data block based on the redundancy version Rv(i) of the $i^{th}$ retransmission, and combine the coded data of the $i^{th}$ retransmission into the virtual circular buffer of the data block based on the starting position $k_0(i)$, where the starting position $k_0(i)$ may be obtained in the following implementation:

$$k_0(i)=R_{subblock}^{TC}\cdot((2\cdot\lceil N_{cb}/(2\cdot N_{rv}\cdot R_{subblock}^{TC})\rceil\cdot Rv(i)+a)\%(3\cdot C_{subblock}^{TC}); \text{ and}$$

$R_{subblock}^{TC}$ is a quantity of rows of bits in the virtual circular buffer of the data block; $N_{cb}$ is a quantity of bits of the coded data; $C_{subblock}^{TC}$ equals 32, and is a quantity of columns of the bits in the virtual circular buffer; $N_{rv}$ is the quantity of redundancy versions and ranges from 4 to $3\cdot C_{subblock}^{TC}$, namely, a value of $N_{rv}$ is at most 96; a is an offset ranging from 0 to $C_{subblock}^{TC}-1$, and determines a starting position corresponding to a redundancy version 0; and a default value of a is 2. $N_{rv}$ and a may be pre-configured, so that values of $N_{rv}$ and a are relatively fixed. It should be noted that the foregoing is merely examples, and the present disclosure is not limited thereto.

The starting position obtained according to the foregoing method is a column starting position, a row number of the starting position is 0, and a column number is $\lfloor k_0(i)/R_{subblock}^{TC}\rfloor$. That is, the starting position is a bit position with a row number of 0 in the virtual circular buffer.

The receiving device stores demodulated soft bits of the retransmitted coded data to the virtual circular buffer of the data block. That the receiving device combines the coded data of the $i^{th}$ retransmission into the virtual circular buffer of the data block may be demodulating the received coded data of the $i^{th}$ retransmission to obtain demodulated soft bits of the $i^{th}$ retransmission, and adding, bit by bit from the starting position $k_0(i)$, the demodulated soft bits of the $i^{th}$ retransmission to demodulated soft bits that are accumulated in first i−1 times of retransmission and that are stored in the virtual circular buffer.

105. The receiving device decodes combined data in the virtual circular buffer of the data block.

The receiving device decodes the combined data in the virtual circular buffer of the data block. Because the combined data stored in the virtual circular buffer is demodulated soft bits accumulated in the initial transmission and i times of retransmission, the receiving device decodes the demodulated soft bits accumulated in the initial transmission and the i times of retransmission in the virtual circular buffer.

Optionally, the method may further include step 106: if decoding fails, the receiving device sends a NACK to the sending device, so that the sending device sends coded data of $(i+1)^{th}$ retransmission.

According to this embodiment of the present disclosure, the receiving device and the sending device maintain a transmission count of each retransmission, and determine a redundancy version of the retransmission by using the transmission count, so that the redundancy version may not be limited to four redundancy versions in the prior art. Therefore, a column starting position of coded data of each retransmission in the virtual circular buffer can be flexibly determined, and a requirement of a high transmission code rate is met.

Figure 2:
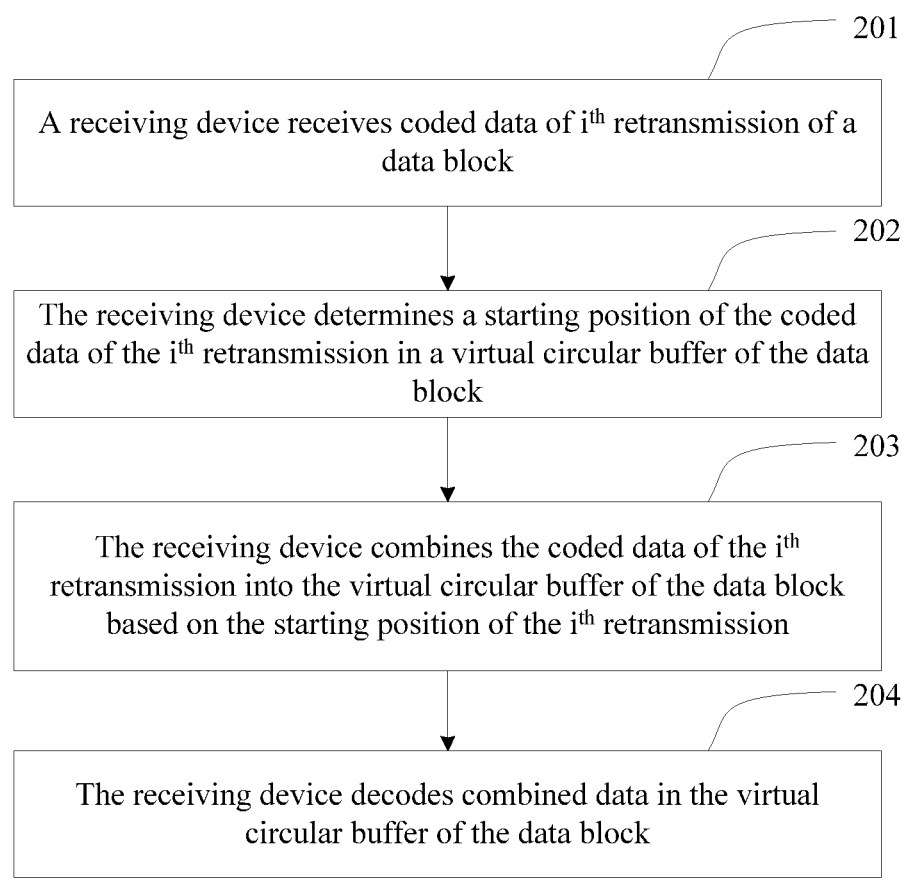
FIG. 2 is a flowchart of an information transmission method according to another embodiment of the present disclosure.

FIG. 2 is a flowchart of an information transmission method according to another embodiment of the present disclosure. As shown in FIG. 2, the method includes the following steps.

201. A receiving device receives coded data of $i^{th}$ retransmission of a data block, where i is an integer greater than 0.

202. The receiving device determines a starting position $l_0(i)$ of the coded data of the $i^{th}$ retransmission in a virtual circular buffer of the data block.

When i=1, the receiving device determines a starting position $l_0(1)$ of coded data of first retransmission in the virtual circular buffer of the data block based on a starting position $l_0(0)$ of coded data of initial transmission in the virtual circular buffer of the data block and a quantity E(0) of bits of the coded data of the initial transmission; or when i>1, the receiving device determines the starting position $l_0(i)$ of the coded data of the $i^{th}$ retransmission in the virtual circular buffer of the data block based on a starting position $l_0(i-1)$ of coded data of $(i-1)^{th}$ retransmission in the virtual circular buffer of the data block and a quantity E(i-1) of bits of the coded data of the $(i-1)^{th}$ retransmission, where the starting position $l_0(i)$ is a bit position of a coded data block in the virtual circular buffer.

When a transmission code rate is relatively high, coded data of each retransmission may not be in integral columns. Therefore, the coded data of the $i^{th}$ retransmission may not start from an integral column of the virtual circular buffer of the data block, that is, not start from a bit position with a row number of 0, but start from any bit in the virtual circular buffer.

The receiving device may determine the starting position $l_0(i)$ of the coded data of the $i^{th}$ retransmission in the virtual circular buffer of the data block based on the following formula:

$$l_0(i)=l_0(i-1)+E(i-1), \text{ where}$$

if i=1, $l_0(i-1)$ is the starting position $l_0(0)=0$ of the coded data of the initial transmission of the data block in the virtual circular buffer of the data block, and E(0) is the quantity of bits of the coded data of the initial transmission; or if i>1, $l_0(i-1)$ is the starting position of the coded data of the $(i-1)^{th}$ retransmission in the virtual circular buffer of the data block, and E(i-1) is the quantity of bits of the coded data of the $(i-1)^{th}$ retransmission that is received by the receiving device; and a row number of $l_0(i)$ in the virtual circular buffer is $l_0(i)$ % $R_{subblock}^{TC}$, and a column number is $\lfloor l_0(i)/R_{subblock}^{TC} \rfloor$; and $R_{subblock}^{TC}$ is a quantity of rows of the coded data block in the virtual circular buffer of the data block.

For example, it is assumed that the starting position $l_0(0)$ of the initial transmission is 0, and that 20 bits are initially transmitted, the starting position $l_0(1)$ of the first retransmission is $l_0(0)+20=20$. The receiving device determines that the starting position $l_0(1)$ of the first retransmission is 20, that is, column $\lfloor l_0(1)/R_{subblock}^{TC} \rfloor$ row $l_0(1)$% $R_{subblock}^{TC}$ in the virtual circular buffer.

It should be noted that the foregoing is merely examples, and this embodiment of the present disclosure is not limited thereto.

203. The receiving device combines the coded data of the $i^{th}$ retransmission received in step 201 into the virtual circular buffer of the data block based on the starting position $l_0(i)$ determined in step 202.

The receiving device stores demodulated soft bits of retransmitted coded data to the virtual circular buffer of the data block. That the receiving device combines the coded data of the $i^{th}$ retransmission into the virtual circular buffer of the data block may be demodulating the received coded data of the $i^{th}$ retransmission to obtain demodulated soft bits of the $i^{th}$ retransmission, and adding, bit by bit from the starting position $l_0(i)$, the demodulated soft bits of the $i^{th}$ retransmission to demodulated soft bits that are accumulated in first i-1 times of retransmission and that are stored in the virtual circular buffer.

204. The receiving device decodes the virtual circular buffer of the data block.

The receiving device decodes combined data in the virtual circular buffer of the data block. Because the combined data stored in the virtual circular buffer is demodulated soft bits accumulated in the initial transmission and i times of retransmission, the receiving device decodes the demodulated soft bits accumulated in the initial transmission and the i times of retransmission in the virtual circular buffer.

If decoding fails, the receiving device sends a NACK to a sending device, so that the sending device sends coded data of $(i+1)^{th}$ retransmission.

This embodiment of the present disclosure is suitable for a scenario in which a retransmission granularity is bits. The receiving device and the sending device determine a starting position of coded data of current transmission in the virtual circular buffer based on a starting position and a quantity of transmitted bits of previous transmission, so that a starting position of coded data of each retransmission in the virtual circular buffer can be flexibly determined, and a requirement of a higher transmission code rate is met.

Figure 3:
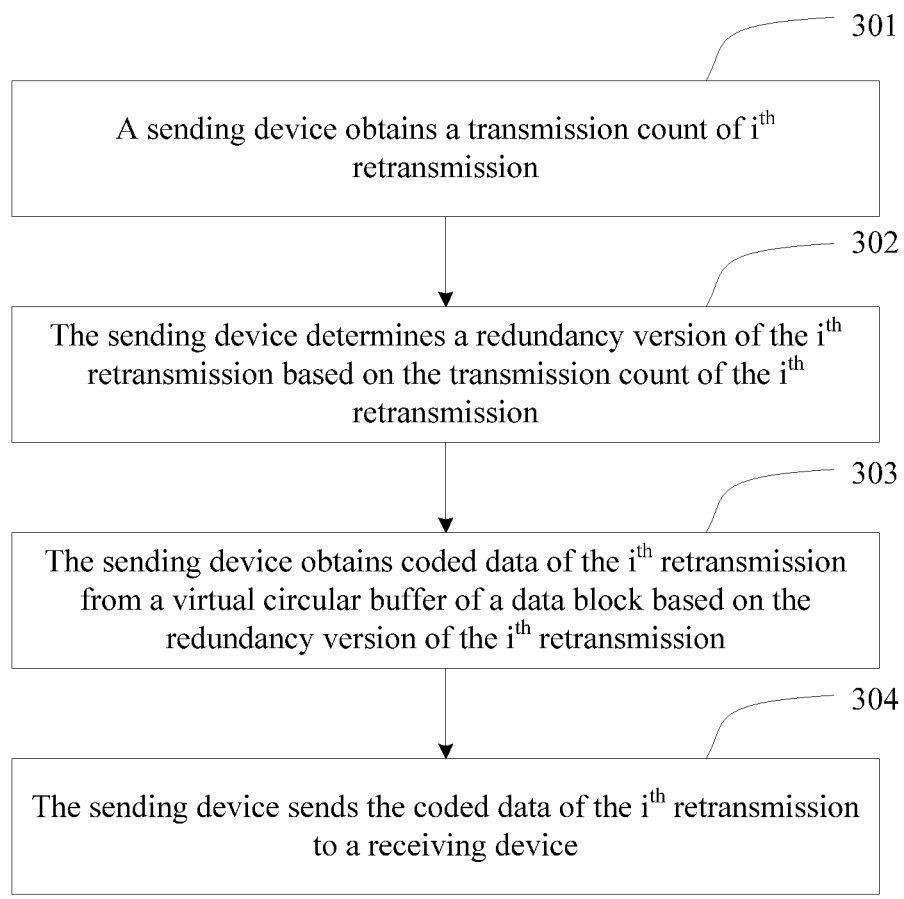
FIG. 3 is a flowchart of an information transmission method according to another embodiment of the present disclosure.

FIG. 3 is a flowchart of an information transmission method according to another embodiment of the present disclosure. As shown in FIG. 3, the method includes the following steps.

301. A sending device obtains a transmission count RvCnt (i) of $i^{th}$ retransmission, where i is an integer greater than 0, and an upper value limit of i is a maximum quantity of retransmission times.

A receiving device and the sending device separately maintain a transmission count for each HARQ process. For the $i^{th}$ retransmission, the sending device obtains the transmission count RvCnt(i) of the $i^{th}$ retransmission. For initial transmission, a transmission count RvCnt(0) is 0.

When i=1, the receiving device receives coded data of the initial transmission and then incorrectly decodes the coded data, and the sending device receives a NACK, and sends coded data of first retransmission to the receiving device; or when i>1, the receiving device receives coded data of $(i-1)^{th}$ retransmission and then incorrectly decodes the coded data, and the sending device receives a NACK, and sends the coded data of the $i^{th}$ retransmission to the receiving device.

In an embodiment of the present disclosure, the receiving device and the sending device may separately maintain a transmission count of a HARQ process according to an agreed rule. For example, the receiving device and the sending device may separately obtain the transmission count RvCnt(i) of the $i^{th}$ retransmission based on RvCnt(i)=RvCnt(i-1)+1. It should be noted that the present disclosure is not limited thereto. The receiving device and the sending device may alternatively agree on another rule to obtain the transmission count RvCnt(i) of the $i^{th}$ retransmission. In this manner, the receiving device and the sending device do not need to exchange the transmission count by using a message, so that an air interface transmission resource can be saved.

In another embodiment of the present disclosure, one end that schedules data may determine the transmission count RvCnt(i) of the $i^{th}$ retransmission, and notify the other end by using scheduling information. For example, when the sending device is a base station, the base station may determine the transmission count RvCnt(i) of the $i^{th}$ retransmission based on RvCnt(i)=RvCnt(i−1)+b+$c_{offset}$, and notify a terminal of the transmission count of the $i^{th}$ retransmission by using scheduling information. A value range of $c_{offset}$ is −2, −1, or 0, and $c_{offset}$ is pre-configured by a system; b is an integer ranging from 0 to 3, and a value of b may be determined by the base station during each retransmission, to ensure that RvCnt(i) is not a negative number. In this manner, b+$c_{offset}$ actually represents an increment of RvCnt (i), and may be a positive number or a negative number. When b+$c_{offset}$ is a negative number, b+$c_{offset}$ represents that a previous transmission count is retransmitted, so that an objective of flexible control is achieved. For another example, when the sending device is a terminal, the terminal may obtain the transmission count RvCnt(i) of the $i^{th}$ retransmission by using scheduling information. In the foregoing manner, to reduce a data volume of air interface transmission, only an information bit, such as latter two bits, of RvCnt(i) may be transmitted by using the scheduling information. After obtaining the information bit of RvCnt(i), the terminal obtains the transmission count RvCnt(i) of the $i^{th}$ retransmission through recovery based on the information bit of RvCnt(i). Because the information bit of RvCnt(i) is in a relatively small quantity, a new field may be added to the scheduling information to send the information bit, or an MCS field may be reused to send the information bit, or a redundancy version field may be used to send the information bit. It should be noted that the foregoing is merely examples, and the present disclosure is not limited thereto.

302. The sending device determines a redundancy version Rv(i) of the $i^{th}$ retransmission based on the transmission count RvCnt(i) of the $i^{th}$ retransmission obtained in step 301.

The redundancy version Rv(i) of the $i^{th}$ retransmission is determined based on the transmission count RvCnt(i) of the $i^{th}$ retransmission. This has been described in step 103 in the foregoing method embodiment, and details are not described herein again.

303. The sending device obtains coded data of the $i^{th}$ retransmission from a virtual circular buffer of a data block based on the redundancy version Rv(i) of the $i^{th}$ retransmission determined in step 302.

A starting position $k_0(i)$ of the coded data of the $i^{th}$ retransmission in the virtual circular buffer of the data block is determined based on the redundancy version Rv(i) of the $i^{th}$ retransmission, and the coded data of the $i^{th}$ retransmission is obtained from the virtual circular buffer of the data block based on the starting position $k_0(i)$. This has been described in step 104 in the foregoing method embodiment, and details are not described herein again.

304. The sending device sends the coded data of the $i^{th}$ retransmission to a receiving device.

According to this embodiment of the present disclosure, the receiving device and the sending device maintain a transmission count of each retransmission, and determine a redundancy version of the retransmission by using the transmission count, so that the redundancy version may not be limited to four redundancy versions in the prior art. Therefore, a column starting position of coded data of each retransmission in the virtual circular buffer can be flexibly determined, and a requirement of a high transmission code rate is met.

Figure 4:
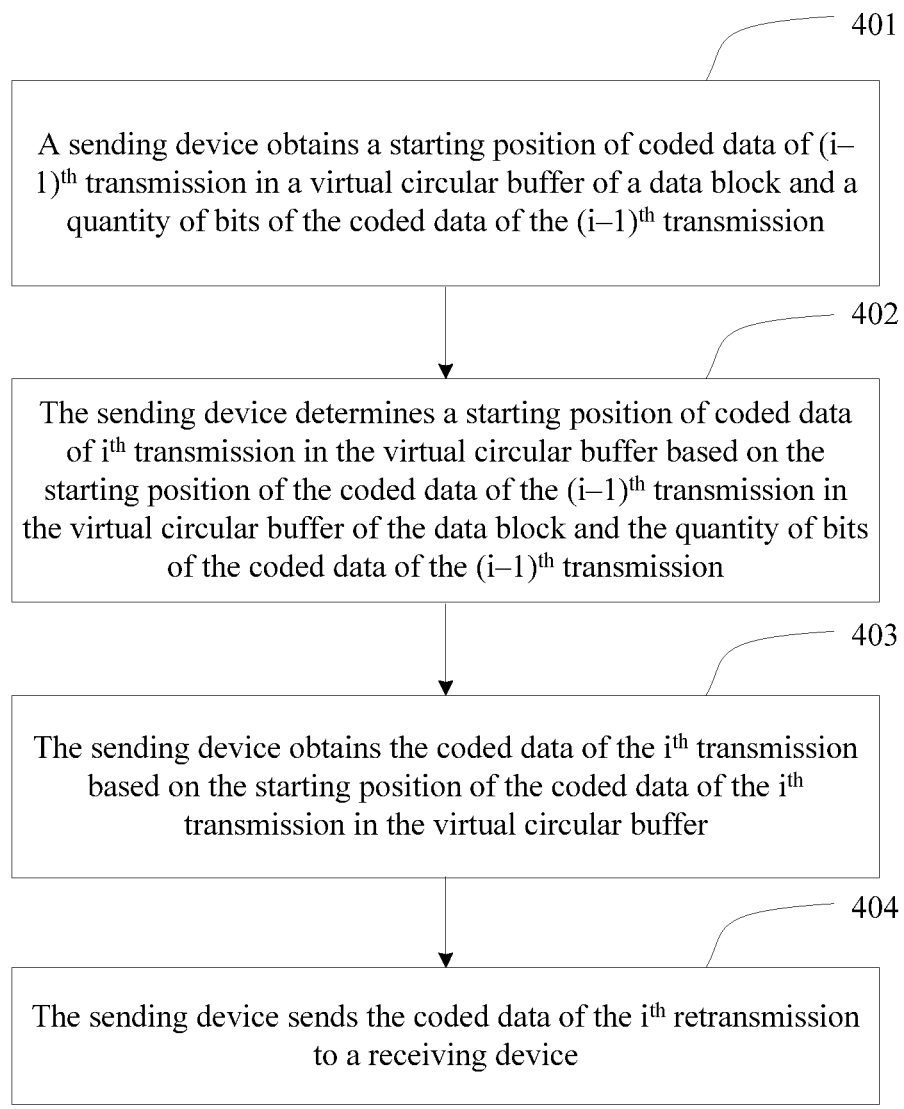
FIG. 4 is a flowchart of an information transmission method according to another embodiment of the present disclosure.

FIG. 4 is a flowchart of an information transmission method according to another embodiment of the present disclosure. As shown in FIG. 4, the method includes the following steps.

401. A sending device obtains a starting position $l_0(i-1)$ of coded data of $(i-1)^{th}$ transmission in a virtual circular buffer of a data block and a quantity E(i−1) of bits of the coded data of the $(i-1)^{th}$ transmission, where i is an integer greater than 0.

When i=1, the coded data of the $(i-1)^{th}$ transmission is a data block of initial transmission; or when i>1, the coded data of the $(i-1)^{th}$ transmission is a data block of retransmission.

402. The sending device determines a starting position $l_0(i)$ of coded data of $i^{th}$ transmission in the virtual circular buffer based on the starting position $l_0(i-1)$ of the coded data of the $(i-1)^{th}$ transmission in the virtual circular buffer of the data block and the quantity E(i−1) of bits of the coded data of the $(i-1)^{th}$ transmission that are obtained in step 401.

The starting position $l_0(i)$ of the coded data of the $i^{th}$ transmission in the virtual circular buffer is determined based on the starting position $l_0(i-1)$ of the coded data of the $(i-1)^{th}$ transmission in the virtual circular buffer of the data block and the quantity E(i−1) of bits of the coded data of the $(i-1)^{th}$ transmission that are obtained. This has been described in step 202 in the foregoing method embodiment, and details are not described herein again.

403. The sending device obtains the coded data of the $i^{th}$ transmission based on the starting position $l_0(i)$, determined in step 402, of the coded data of the $i^{th}$ transmission in the virtual circular buffer.

404. The sending device sends the coded data of the $i^{th}$ retransmission to a receiving device.

This embodiment of the present disclosure is suitable for a scenario in which a retransmission granularity is bits. The receiving device and the sending device determine a starting position of coded data of current transmission in the virtual circular buffer based on a starting position and a quantity of transmitted bits of previous transmission, so that a starting position of coded data of each retransmission in the virtual circular buffer can be flexibly determined, and a requirement of a higher transmission code rate is met.

Figure 5:
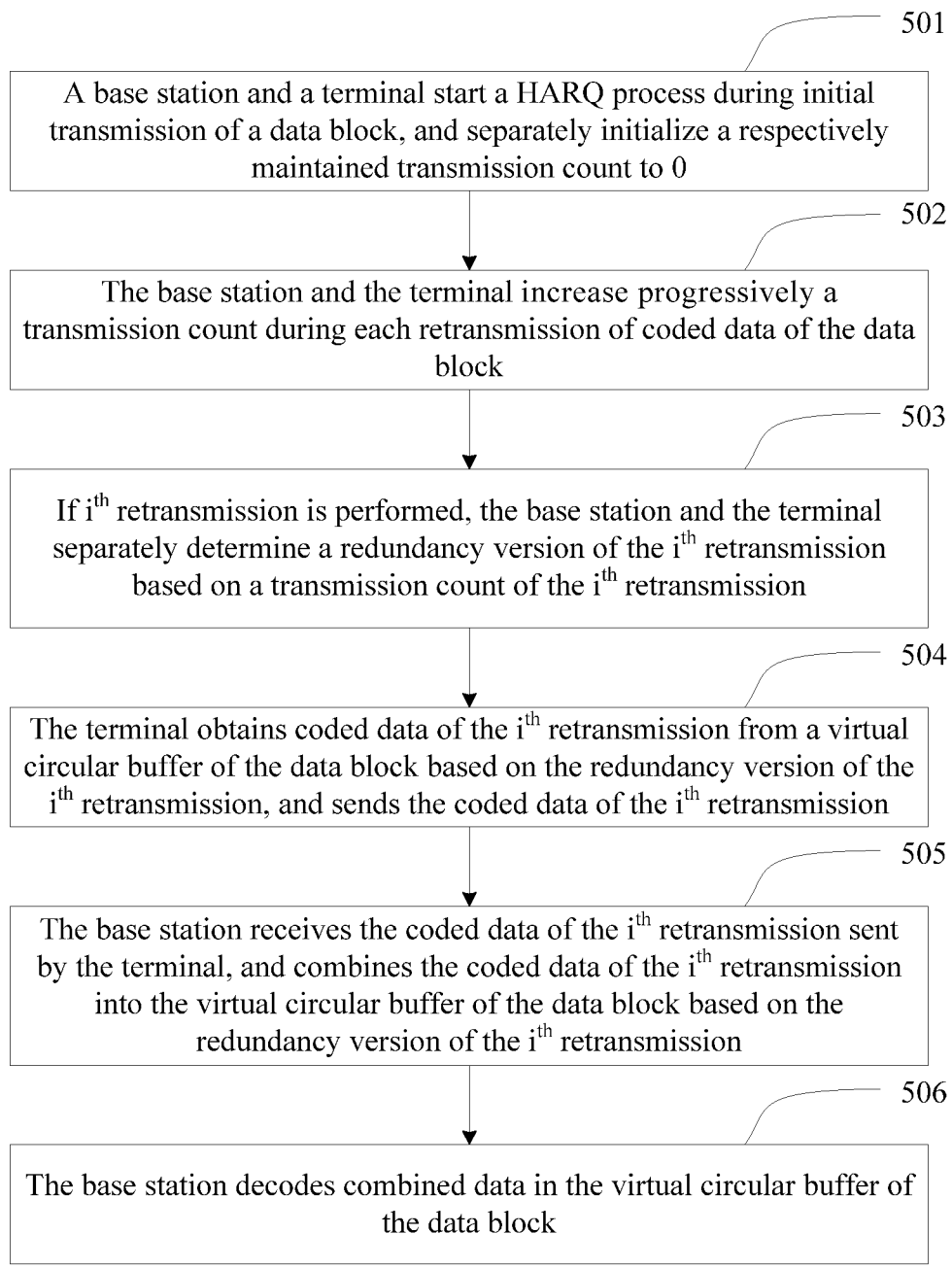
FIG. 5 is a flowchart of an information transmission method according to another embodiment of the present disclosure.

FIG. 5 is a flowchart of an information transmission method according to another embodiment of the present disclosure. The method may be used for non-adaptive retransmission. For ease of description, description is provided by using an example in which a receiving device is a base station and a sending device is a terminal. It should be noted that the present disclosure is not limited thereto. As shown in FIG. 5, the method includes the following steps.

501. A base station and a terminal start a HARQ process during initial transmission of a data block, and separately initialize a respectively maintained transmission count RvCnt(0) to 0.

502. The base station and the terminal increase progressively a transmission count RvCnt(i) during each retransmission of coded data of the data block, and for coded data of $i^{th}$ retransmission, RvCnt(i)=RvCnt(i−1)+1, where i is an integer greater than 0, and an upper limit of i is a maximum quantity of retransmission times.

For the receiving device, the retransmission of the coded data of the data block herein is receiving retransmitted coded data, and for the sending device, is sending retransmitted coded data.

For example, when the terminal sends coded data of first retransmission, a transmission count RvCnt(1) maintained by the terminal is 1; and when the base station receives the coded data of the first retransmission, a transmission count RvCnt(1) maintained by the base station is 1.

For another example, when the terminal sends the coded data of the $i^{th}$ retransmission, a transmission count RvCnt(i) maintained by the terminal is i; and when the base station receives the coded data of the $i^{th}$ retransmission, a transmission count RvCnt(i) maintained by the base station is i.

It should be noted that the foregoing is merely examples, and this embodiment of the present disclosure is not limited thereto.

503. If the $i^{th}$ retransmission is performed, the base station and the terminal separately determine a redundancy version Rv(i) of the $i^{th}$ retransmission based on the transmission count RvCnt(i) of the $i^{th}$ retransmission.

If i=1, the base station feeds back a NACK for a decoding error of coded data of the initial transmission, and the terminal sends coded data of first retransmission; or if i>1, the base station feeds back a NACK for a decoding error of coded data of $(i-1)^{th}$ retransmission, and the terminal sends the coded data of the $i^{th}$ retransmission.

The terminal and the base station separately obtain the transmission count RvCnt(i) of the $i^{th}$ retransmission. As described in step 502, the transmission count RvCnt(i) of the $i^{th}$ retransmission is i.

The base station and the terminal separately determine the redundancy version Rv(i) of the $i^{th}$ retransmission based on the transmission count RvCnt(i) of the $i^{th}$ retransmission.

The base station and the terminal may obtain the redundancy version Rv(i) of the $i^{th}$ retransmission in a plurality of manners. Refer to step 103 in the foregoing method embodiment, and details are not described herein again.

504. The terminal obtains the coded data of the $i^{th}$ retransmission from a virtual circular buffer of the data block based on the redundancy version Rv(i) of the $i^{th}$ retransmission determined in step 503, and sends the coded data of the $i^{th}$ retransmission.

The terminal determines a starting position $k_0(i)$ of the coded data of the $i^{th}$ retransmission in the virtual circular buffer of the data block based on the redundancy version Rv(i) of the $i^{th}$ retransmission, and obtains the coded data of the $i^{th}$ retransmission from the virtual circular buffer of the data block based on the starting position $k_0(i)$. Refer to step 104 in the foregoing method embodiment, and details are not described herein again.

The terminal sends the obtained coded data of the $i^{th}$ retransmission to the base station.

505. The base station receives the coded data of the $i^{th}$ retransmission sent by the terminal, and combines the coded data of the $i^{th}$ retransmission into the virtual circular buffer of the data block based on the redundancy version Rv(i) of the $i^{th}$ retransmission determined in step 503.

The base station may determine the starting position $k_0(i)$ of the coded data of the $i^{th}$ retransmission in the virtual circular buffer of the data block based on the redundancy version Rv(i) of the $i^{th}$ retransmission, and combine the coded data of the $i^{th}$ retransmission into the virtual circular buffer of the data block based on the starting position $k_0(i)$. Refer to step 104 in the foregoing method embodiment, and details are not described herein again.

506. The base station decodes combined data in the virtual circular buffer of the data block.

The base station decodes the combined data in the virtual circular buffer of the data block. Because the combined data stored in the virtual circular buffer is demodulated soft bits accumulated in the initial transmission and i times of retransmission, the receiving device decodes the demodulated soft bits accumulated in the initial transmission and the i times of retransmission in the virtual circular buffer.

If decoding fails, and i is less than the maximum quantity of retransmission times, the base station sends a NACK to the terminal, so that the terminal sends coded data of $(i+1)^{th}$ retransmission. If decoding is correct or i reaches the maximum quantity of retransmission times, the HARQ process ends.

For the non-adaptive retransmission, the base station and the terminal do not need to exchange the transmission count or the redundancy version by using a message, so that an air interface transmission resource can be saved.

Figure 6:
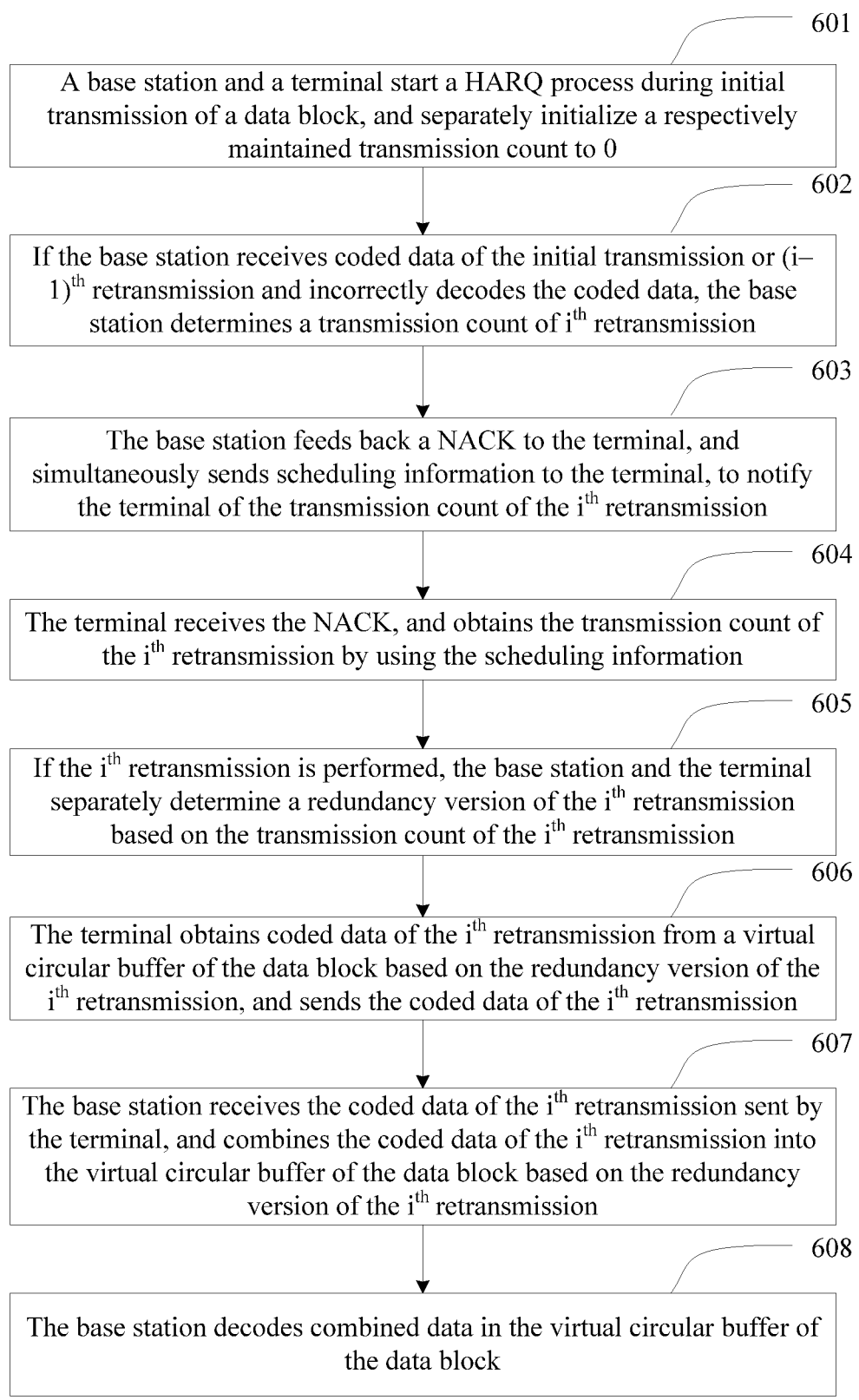
FIG. 6 is a flowchart of an information transmission method according to another embodiment of the present disclosure.

FIG. 6 is a flowchart of an information transmission method according to another embodiment of the present disclosure. The method may be used for uplink adaptive retransmission. For ease of description, description is provided by using an example in which a receiving device is a base station and a sending device is a terminal. It should be noted that the present disclosure is not limited thereto. As shown in FIG. 6, the method includes the following steps.

601. A base station and a terminal start a HARQ process during initial transmission of a data block, and separately initialize a respectively maintained transmission count RvCnt(0) to 0.

602. If the base station receives coded data of the initial transmission or $(i-1)^{th}$ retransmission and incorrectly decodes the coded data, the base station determines a transmission count RvCnt(i) of $i^{th}$ retransmission, where i is an integer greater than 0, and an upper value limit of i is a maximum quantity of retransmission times.

The base station may determine the transmission count RvCnt(i) of the $i^{th}$ retransmission based on RvCnt(i)=RvCnt(i-1)+b+$c_{offset}$. A value range of $c_{offset}$ is -2, -1, or 0, and $c_{offset}$ is pre-configured by a system; b is an integer ranging from 0 to 3, and a value of b may be determined by the base station during each retransmission, to ensure that RvCnt(i) is not a negative number. In this manner, b+$c_{offset}$ actually represents an increment of RvCnt(i), and may be a positive number or a negative number. When b+$c_{offset}$ is a negative number, b+$c_{offset}$ represents that a previous transmission count is retransmitted, so that an objective of flexible control is achieved.

603. The base station feeds back a NACK to the terminal, and simultaneously sends scheduling information to the terminal, to notify the terminal of the transmission count RvCnt(i) of the $i^{th}$ retransmission.

The base station may add the transmission count RvCnt(i) of the $i^{th}$ retransmission to the scheduling information. To reduce a data volume of air interface transmission, the base station may alternatively transmit only an information bit, such as latter two bits, of RvCnt(i) by using the scheduling information. Therefore, after obtaining the information bit of RvCnt(i), the terminal obtains the transmission count RvCnt(i) of the $i^{th}$ retransmission through recovery based on the information bit of RvCnt(i). Because the information bit of RvCnt(i) is in a relatively small quantity, a new field may be added to the scheduling information to send the information bit, or an MCS field may be reused to send the information bit, or a redundancy version field may be used to send the information bit.

For example, the transmission count RvCnt(i) of the $i^{th}$ retransmission is 5, and latter two bits of the transmission count RvCnt(i) are 01, that is, the information bit of the transmission count of the $i^{th}$ retransmission is 1. The base station may add two bits to the scheduling information to send the information bit, or reuse an MCS field to send the information bit. For example, as shown in Table 1, Table 1 is a mapping between an MCS index and an information bit of a transmission count RvCnt(i) of $i^{th}$ retransmission. If the information bit of the transmission count of the $i^{th}$ retransmission is 1, 2, and 3, MCS 29 to MCS 31 are selected respectively. If the information bit of the transmission count of the $i^{th}$ retransmission is 0, an MCS index consistent with initial transmission is selected. Assuming that the information bit of the transmission count of the $i^{th}$ retransmission is 1, an MCS index is 29.

TABLE 1

Mapping between an MCS index and an information bit of a transmission count RvCnt(i) of $i^{th}$ retransmission

| MCS index | Information bit of RvCnt(i) |
|---|---|
| 0 to 28 | 0 |
| 29 | 1 |
| 30 | 2 |
| 31 | 3 |

The base station may further send the information bit of the transmission count of the $i^{th}$ retransmission by using 2 bits of a redundancy version field.

It should be noted that the foregoing is merely examples, and the present disclosure is not limited thereto.

604. The terminal receives the NACK, and obtains the transmission count RvCnt(i) of the $i^{th}$ retransmission by using the scheduling information.

If the scheduling information carries the transmission count RvCnt(i) of the $i^{th}$ retransmission, the terminal obtains the transmission count RvCnt(i) of the $i^{th}$ retransmission.

If the scheduling information carries the information bit of the transmission count of the $i^{th}$ retransmission, the terminal obtains the information bit of the transmission count of the $i^{th}$ retransmission, and obtains the transmission count RvCnt(i) of the $i^{th}$ retransmission based on the information bit. For example, the terminal may obtain the transmission count RvCnt(i) of the $i^{th}$ retransmission in a mapping manner of Table 2.

For example, when $c_{offset}=0$ and a transmission count RvCnt(i-1) of $(i-1)^{th}$ retransmission of the base station is 5, the base station determines that a transmission count RvCnt(i) of $i^{th}$ retransmission is 6; the terminal obtains, from scheduling information, that an information bit of the transmission count RvCnt(i) of the $i^{th}$ retransmission of the base station is 2; and a transmission count RvCnt(i-1) of $(i-1)^{th}$ retransmission of the terminal is 5. Therefore, an information bit of the transmission count RvCnt(i-1) of the $(i-1)^{th}$ retransmission of the terminal is 1. The terminal obtains, based on a mapping of Table 2, that RvCnt(i)=RvCnt(i-1)+1=5+1=6.

For another example, when $c_{offset}=1$ and a transmission count RvCnt(i-1) of $(i-1)^{th}$ retransmission of the base station is 3, the base station determines that a transmission count RvCnt(i) of $i^{th}$ retransmission is 5; the terminal obtains, from scheduling information, that an information bit of the transmission count RvCnt(i) of the $i^{th}$ retransmission of the base station is 1; and a transmission count RvCnt(i-1) of $(i-1)^{th}$ retransmission of the terminal is 3. Therefore, an information bit of the transmission count RvCnt(i-1) of the $(i-1)^{th}$ retransmission of the terminal is 3. The terminal obtains, based on a mapping of Table 2, that RvCnt(i)=RvCnt(i-1)+2=3+2=5.

Therefore, the terminal may obtain the transmission count RvCnt(i) of the $i^{th}$ retransmission by using the scheduling information, and the transmission counts on the terminal and the base station are synchronized.

It should be noted that the foregoing is merely examples, and the present disclosure is not limited thereto.

Refer to steps 503-506 in the foregoing embodiment for steps 605-608.

For adaptive retransmission, a base station that schedules data determines a transmission count of retransmission, and notifies a terminal by using a relatively small air interface overhead, so that a starting position of each retransmission can be flexibly controlled, and system performance can be enhanced.

The following specifically describes an execution process of the steps in the foregoing embodiments by using PUSCH adaptive retransmission as an example. It is assumed that a transmission code rate Rate(i) of initial transmission and a transmission code rate Rate(i) of each retransmission are the same, Rate(i) is 2/3, a quantity $N_{rv}$ of redundancy versions is 16, an offset a is 2, $c_{offset}$ is 0, $R_{subblock}^{TC}$ is 36, and that $N_{cb}$ is 3372.

TABLE 2

Mapping table of a transmission count of $i^{th}$ retransmission of a terminal

| Information bit of RvCnt(i) of a base station | Information bit of RvCnt(i − 1) of a terminal | RvCnt(i) of the terminal | | |
|---|---|---|---|---|
| | | $c_{offset}=0$ | $c_{offset}=1$ | $c_{offset}=2$ |
| 0 | 0 | RvCnt(i − 1) + 0 | RvCnt(i − 1) + 0 | RvCnt(i − 1) + 0 |
| | 1 | RvCnt(i − 1) + 3 | RvCnt(i − 1) − 1 | RvCnt(i − 1) − 1 |
| | 2 | RvCnt(i − 1) + 2 | RvCnt(i − 1) + 2 | RvCnt(i − 1) − 2 |
| | 3 | RvCnt(i − 1) + 1 | RvCnt(i − 1) + 1 | RvCnt(i − 1) + 1 |
| 1 | 0 | RvCnt(i − 1) + 1 | RvCnt(i − 1) + 1 | RvCnt(i − 1) + 1 |
| | 1 | RvCnt(i − 1) + 0 | RvCnt(i − 1) + 0 | RvCnt(i − 1) + 0 |
| | 2 | RvCnt(i − 1) + 3 | RvCnt(i − 1) − 1 | RvCnt(i − 1) − 1 |
| | 3 | RvCnt(i − 1) + 2 | RvCnt(i − 1) + 2 | RvCnt(i − 1) − 2 |
| 2 | 0 | RvCnt(i − 1) + 2 | RvCnt(i − 1) + 2 | RvCnt(i − 1) − 2 |
| | 1 | RvCnt(i − 1) + 1 | RvCnt(i − 1) + 1 | RvCnt(i − 1) + 1 |
| | 2 | RvCnt(i − 1) + 0 | RvCnt(i − 1) + 0 | RvCnt(i − 1) + 0 |
| | 3 | RvCnt(i − 1) + 3 | RvCnt(i − 1) − 1 | RvCnt(i − 1) − 1 |
| 3 | 0 | RvCnt(i − 1) + 3 | RvCnt(i − 1) − 1 | RvCnt(i − 1) − 1 |
| | 1 | RvCnt(i − 1) + 2 | RvCnt(i − 1) + 2 | RvCnt(i − 1) − 2 |
| | 2 | RvCnt(i − 1) + 1 | RvCnt(i − 1) + 1 | RvCnt(i − 1) + 1 |
| | 3 | RvCnt(i − 1) + 0 | RvCnt(i − 1) + 0 | RvCnt(i − 1) + 0 |

(1) A base station and a terminal start a HARQ process during initial transmission of a data block, and separately initialize a respectively maintained transmission count RvCnt(0) to 0, an initial redundancy version Rv(0) is 0, and the base station selects an MCS index of 9, and notifies the terminal by using scheduling information.

(2) The terminal and the base station may separately determine, based on the following formula, that a starting position $k_0(0)$ of coded data of the initial transmission in a virtual circular buffer is 72:

$$k_0(i) = R_{subblock}^{TC} \cdot ((2 \cdot \lceil N_{cb}/(2 \cdot N_{rv} \cdot R_{subblock}^{TC}) \rceil \cdot Rv(i) + a) \% (3 \cdot C_{subblock}^{TC}); \text{ and}$$

(3) The terminal obtains the coded data of the initial transmission from the starting position $k_0(0)=72$, that is, a position of column 2 row 0, and sends the coded data of the initial transmission.

(4) The base station receives the coded data of the initial transmission and then performs demodulation, to obtain demodulated soft bits of the initial transmission, stores the demodulated soft bits from the starting position $k_0(0)=72$, that is, the position starting from column 2 row 0, of the virtual circular buffer, and decodes soft bits in the virtual circular buffer.

(5) If the base station incorrectly decodes the soft bits, the base station feeds back a NACK, and sends an information bit 1 of a transmission count RvCnt(1)=1 of first retransmission by reusing an MCS field in scheduling information, where an MCS index corresponding to the information bit 1 is 29 based on Table 1.

(6) The terminal receives the scheduling information, obtains, based on Table 1, that the information bit of the transmission count RvCnt(1) of the first retransmission is 1, and determines, based on Table 2, that the transmission count RvCnt(1) of the first retransmission is RvCnt(0)+1=1.

(7) Both the terminal and the base station may obtain that a redundancy version Rv(1) of the first retransmission is 8 through calculation based on the following formula:

$$Rv(i) = (Rv(i-1) + \text{round}((RvCnt(i) - RvCnt(i-1)) \cdot 1/(Rate(i-1) \cdot 3.0) \cdot N_{rv}) \% N_{rv}) \% N_{rv}.$$

(8) The terminal and the base station may separately determine that a starting position $k_0(1)$ of coded data of the first retransmission in the virtual circular buffer is 1800.

(9) The terminal obtains the coded data of the first retransmission from the starting position $k_0(1)=1800$, that is, a position starting from column 50 row 0, in the virtual circular buffer, and sends the coded data of the first retransmission.

(10) The base station receives the coded data of the first retransmission and then performs demodulation, to obtain demodulated soft bits of the first retransmission; adds, bit by bit from the starting position $k_0(1)=1800$, that is, the position starting from column 50 row 0, in the virtual circular buffer, the demodulated soft bits of the first retransmission to the demodulated soft bits of the initial transmission in the virtual circular buffer; and decodes demodulated soft bits accumulated in the virtual circular buffer.

(11) If the base station incorrectly decodes the demodulated soft bits, the base station feeds back a NACK, and sends an information bit 2 of a transmission count RvCnt(2)=2 of second retransmission by reusing the MCS field in the scheduling information, where an MCS index corresponding to the information bit 2 is 30 based on Table 1.

(12) If the terminal does not receive the scheduling information or the scheduling information is incorrect, the terminal does not send data; and in this case, the transmission count maintained by the terminal maintain is still 1.

(13) The base station does not receive retransmitted data, feeds back a NACK, and sends an information bit 3 of a transmission count RvCnt(3)=3 of third retransmission by reusing the MCS field in the scheduling information, where an MCS index corresponding to the information bit 3 is 31 based on Table 1.

(14) The terminal correctly receives the scheduling information, and determines, based on Table 2, that RvCnt(3) is RvCnt(2)+2=1+2=3.

(15) Both the terminal and the base station may determine that a redundancy version Rv(3) of the third retransmission is 8.

(16) The terminal and the base station may separately determine that a starting position $k_0(3)$ of coded data of the third retransmission in the virtual circular buffer is 1800.

(17) The terminal obtains the coded data of the third retransmission from the starting position $k_0(3)=1800$, that is, a position starting from column 50 row 0, in the virtual circular buffer, and sends the coded data of the third retransmission.

(18) The base station receives the coded data of the third retransmission and then performs demodulation, to obtain demodulated soft bits of the third retransmission; adds, bit by bit from the starting position $k_0(3)=1800$, that is, the position starting from column 50 row 0, in the virtual circular buffer, the demodulated soft bits of the third retransmission to demodulated soft bits stored in the virtual circular buffer; and decodes demodulated soft bits accumulated in the virtual circular buffer.

(19) The base station correctly decodes the demodulated soft bits, and retransmission ends.

Figure 7:
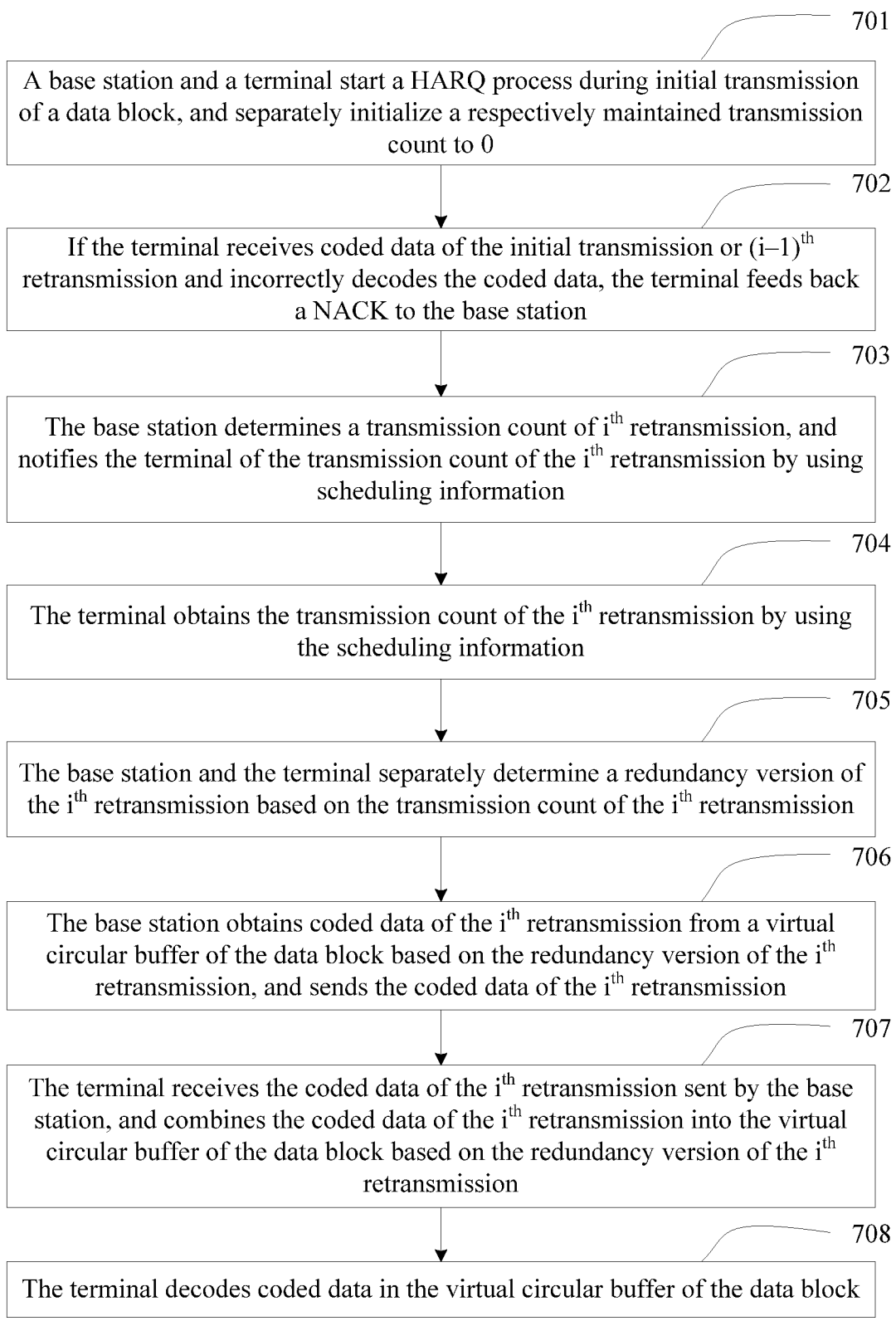
FIG. 7 is a flowchart of an information transmission method according to another embodiment of the present disclosure.

FIG. 7 is a flowchart of an information transmission method according to another embodiment of the present disclosure. The method may be used for downlink adaptive retransmission. For ease of description, description is provided by using an example in which a receiving device is a terminal and a sending device is a base station. It should be noted that the present disclosure is not limited thereto. As shown in FIG. 7, the method includes the following steps.

701. A base station and a terminal start a HARQ process during initial transmission of a data block, and separately initialize a respectively maintained transmission count RvCnt(0) to 0.

702. If the terminal receives coded data of the initial transmission or $(i-1)^{th}$ retransmission and incorrectly decodes the coded data, the terminal feeds back a NACK to the base station, where i is an integer greater than 0, and an upper limit of i is a maximum quantity of retransmission times.

703. The base station determines a transmission count RvCnt(i) of $i^{th}$ retransmission, and notifies the terminal of the transmission count RvCnt(i) of the $i^{th}$ retransmission by using scheduling information.

The base station may add the transmission count RvCnt(i) of the $i^{th}$ retransmission to the scheduling information. To reduce a data volume of air interface transmission, the base station may alternatively transmit only an information bit, such as latter two bits, of RvCnt(i) by using the scheduling information. Therefore, after obtaining the information bit of RvCnt(i), the terminal obtains the transmission count RvCnt(i) of the $i^{th}$ retransmission through recovery based on the information bit of RvCnt(i). Because the information bit of RvCnt(i) is in a relatively small quantity, a new field may be added to the scheduling information to send the information bit, or an MCS field may be reused to send the information bit, or a redundancy version field may be used to send the information bit. Refer to related description in step 603 in the foregoing embodiment, and details are not described herein again.

704. The terminal obtains the transmission count RvCnt(i) of the $i^{th}$ retransmission by using the scheduling information.

The terminal obtains the transmission count RvCnt(i) of the $i^{th}$ retransmission by using the scheduling information. Refer to step 604 in the foregoing embodiment, and details are not described herein again.

705. The base station and the terminal separately determine a redundancy version Rv(i) of the $i^{th}$ retransmission based on the transmission count RvCnt(i) of the $i^{th}$ retransmission.

706. The base station obtains coded data of the $i^{th}$ retransmission from a virtual circular buffer of the data block based on the redundancy version Rv(i) of the $i^{th}$ retransmission determined in step 705, and sends the coded data of the $i^{th}$ retransmission.

The base station determines a starting position $k_0(i)$ of the coded data of the $i^{th}$ retransmission in the virtual circular buffer of the data block based on the redundancy version Rv(i) of the $i^{th}$ retransmission, and obtains the coded data of the $i^{th}$ retransmission from the virtual circular buffer of the data block based on the starting position $k_0(i)$. Refer to step 104 in the foregoing method embodiment, and details are not described herein again.

The base station sends the obtained coded data of the $i^{th}$ retransmission to the terminal.

707. The terminal receives the coded data of the $i^{th}$ retransmission sent by the base station, and combines the coded data of the $i^{th}$ retransmission into the virtual circular buffer of the data block based on the redundancy version Rv(i) of the $i^{th}$ retransmission determined in step 705.

The terminal may determine the starting position $k_0(i)$ of the coded data of the $i^{th}$ retransmission in the virtual circular buffer of the data block based on the redundancy version Rv(i) of the $i^{th}$ retransmission, and combine the coded data of the $i^{th}$ retransmission into the virtual circular buffer of the data block based on the starting position $k_0(i)$. Refer to step 104 in the foregoing method embodiment, and details are not described herein again.

708. The terminal decodes combined data in the virtual circular buffer of the data block.

The terminal decodes the combined data in the virtual circular buffer of the data block. Because the combined data stored in the virtual circular buffer is demodulated soft bits accumulated in the initial transmission and i times of retransmission, the terminal decodes the demodulated soft bits accumulated in the initial transmission and the i times of retransmission in the virtual circular buffer.

If decoding fails, and i is less than the maximum quantity of retransmission times, the terminal sends a NACK to the base station, so that the base station sends coded data of $(i+1)^{th}$ retransmission. If decoding is correct or i reaches the maximum quantity of retransmission times, the HARQ process ends.

Figure 8:
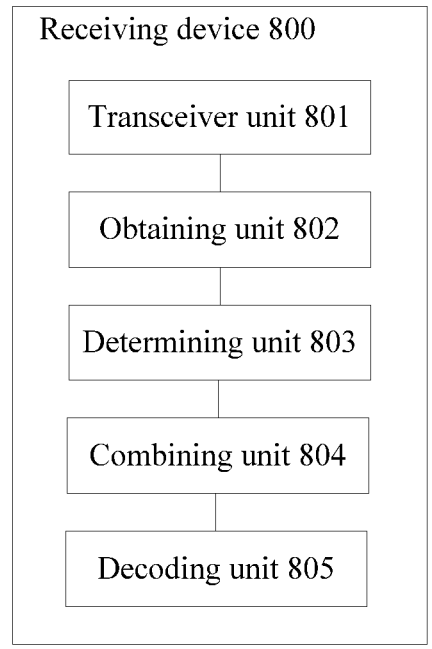
FIG. 8 is a structural diagram of a receiving device according to another embodiment of the present disclosure.

FIG. 8 is a structural diagram of a receiving device 800 according to another embodiment of the present disclosure. As shown in FIG. 8, the receiving device 800 includes a transceiver unit 801, an obtaining unit 802, a determining unit 803, a combining unit 804, and a decoding unit 805.

The transceiver unit 801 is configured to receive coded data of $i^{th}$ retransmission of a data block, where i is an integer greater than 0, and an upper limit of i is a maximum quantity of retransmission times.

When i=1, if the decoding unit 805 incorrectly decodes coded data of initial transmission, the transceiver unit 801 sends a NACK to a sending device, and the transceiver unit 801 receives coded data of first retransmission; or when i>1, if the decoding unit 805 incorrectly decodes coded data of $(i-1)^{th}$ retransmission, the transceiver unit 801 sends a NACK to a sending device, and the transceiver unit 801 receives the coded data of the $i^{th}$ retransmission.

The obtaining unit 802 is configured to obtain a transmission count RvCnt(i) of the $i^{th}$ retransmission.

For the $i^{th}$ retransmission, the obtaining unit 802 obtains the transmission count RvCnt(i) of the $i^{th}$ retransmission. For the initial transmission, a transmission count RvCnt(0) is 0.

In an embodiment of the present disclosure, the receiving device and the sending device may separately maintain a transmission count of a HARQ process according to an agreed rule. For example, the obtaining unit 802 may obtain the transmission count RvCnt(i) of the $i^{th}$ retransmission based on RvCnt(i)=RvCnt(i-1)+1. It should be noted that the present disclosure is not limited thereto. The obtaining unit 802 may alternatively obtain the transmission count RvCnt(i) of the $i^{th}$ retransmission according to another rule on which the receiving device and the sending device agree. In this manner, the receiving device and the sending device do not need to exchange the transmission count by using a message, so that an air interface transmission resource can be saved.

In another embodiment of the present disclosure, one end that schedules data may determine the transmission count RvCnt(i) of the $i^{th}$ retransmission, and notify the other end by using scheduling information. For example, when the receiving device is a base station, the obtaining unit 802 may determine the transmission count RvCnt(i) of the $i^{th}$ retransmission based on RvCnt(i)=RvCnt(i-1)+b+$c_{offset}$, and the transceiver unit 801 is further configured to send scheduling information, and notify a terminal of the transmission count of the $i^{th}$ retransmission by using the scheduling information. A value range of $c_{offset}$ is -2, -1, or 0, and $c_{offset}$ is pre-configured by a system; b is an integer ranging from 0 to 3, and a value of b may be determined by the obtaining unit 802 during each retransmission, to ensure that RvCnt(i) is not a negative number. In this manner, b+$c_{offset}$ actually represents an increment of RvCnt(i), and may be a positive number or a negative number. When b+$c_{offset}$ is a negative number, b+$c_{offset}$ represents that a previous transmission count is retransmitted, so that an objective of flexible control is achieved. For another example, when the receiving device is a terminal, the transceiver unit 801 is further configured to receive scheduling information, and the obtaining unit 802 may obtain the transmission count RvCnt(i) of the $i^{th}$ retransmission by using the scheduling information. In the foregoing manner, to reduce a data volume of air interface transmission, only an information bit, such as latter two bits, of RvCnt(i) may be transmitted by using the scheduling information. After obtaining the information bit of RvCnt(i), the terminal obtains the transmission count RvCnt(i) of the $i^{th}$ retransmission through recovery based on the information bit of RvCnt(i). Because the information bit of RvCnt(i) is in a relatively small quantity, a new field may be added to the scheduling information to send the information bit, or an MCS field may be reused to send the information bit, or a redundancy version field may be used to send the information bit. It should be noted that the foregoing is merely examples, and the present disclosure is not limited thereto.

The determining unit 803 is configured to determine a redundancy version Rv(i) of the $i^{th}$ retransmission based on the transmission count RvCnt(i) of the $i^{th}$ retransmission obtained by the obtaining unit 802.

In an embodiment of the present disclosure, the determining unit 803 may obtain the redundancy version Rv(i) of the $i^{th}$ retransmission in a plurality of manners, for example, may obtain the redundancy version Rv(i) of the $i^{th}$ retransmission through calculation by using any one of the following formulas:

$$Rv(i)=(Rv(i-1)+\text{round}((RvCnt(i)-RvCnt(i-1))\cdot 1/(Rate(i-1)\cdot 3.0)\cdot N_{rv})\% N_{rv})\% N_{rv}; \text{ or}$$

$$Rv(i)=(Rv(i-1)+\lfloor (RvCnt(i)-RvCnt(i-1))\cdot 1/(Rate(i-1)\cdot 3.0)\cdot N_{rv}\rfloor \% N_{rv})\% N_{rv}; \text{ or}$$

$$Rv(i)=(Rv(i-1)+\lceil (RvCnt(i)-RvCnt(i-1))\cdot 1/(Rate(i-1)\cdot 3.0)\cdot N_{rv}\rceil \% N_{rv})\% N_{rv}, \text{ where}$$

if i=1, Rv(0) is a redundancy version of the initial transmission of the data block, RvCnt(0) is the transmission count of the initial transmission, and is initially 0, and Rate(0) is a transmission code rate of the initial transmission; or if i>1, Rv(i−1) is a redundancy version of $(i-1)^{th}$ retransmission, RvCnt(i−1) is a transmission count of the $(i-1)^{th}$ retransmission, and Rate(i−1) is a transmission code rate of the $(i-1)^{th}$ retransmission; and $N_{rv}$ is a quantity of redundancy versions; round(•) represents rounding off; % represents performing modulo operation; $\lceil \cdot \rceil$ represents rounding up; and $\lfloor \cdot \rfloor$ represents rounding down.

It should be noted that the foregoing is merely examples, and the present disclosure is not limited thereto.

The combining unit 804 is configured to combine the coded data of the $i^{th}$ retransmission into a virtual circular buffer of the data block based on the redundancy version Rv(i) of the $i^{th}$ retransmission determined by the determining unit 803.

The combining unit 804 may determine a starting position $k_0(i)$ of the coded data of the $i^{th}$ retransmission in the virtual circular buffer of the data block based on the redundancy version Rv(i) of the $i^{th}$ retransmission, and combine the coded data of the $i^{th}$ retransmission into the virtual circular buffer of the data block based on the starting position $k_0(i)$, where the starting position $k_0(i)$ may be obtained in the following implementation:

$$k_0(i)=R_{subblock}^{TC}\cdot ((2\cdot \lceil N_{cb}/(2\cdot N_{rv}\cdot R_{subblock}^{TC})\rceil \cdot Rv(i)+a)\% (3\cdot C_{subblock}^{TC}); \text{ and}$$

$R_{subblock}^{TC}$ is a quantity of rows of bits in the virtual circular buffer of the data block; $N_{cb}$ is a quantity of bits of the coded data; $C_{subblock}^{TC}$ equals 32, and is a quantity of columns of the bits in the virtual circular buffer; $N_{rv}$ is the quantity of redundancy versions and ranges from 4 to $3\cdot C_{subblock}^{TC}$, namely, a value of $N_{rv}$ is at most 96; a is an offset ranging from 0 to $C_{subblock}^{TC}-1$, and determines a starting position corresponding to a redundancy version 0; and a default value of a is 2. $N_{rv}$ and a may be preconfigured, so that values of $N_{rv}$ and a are relatively fixed. It should be noted that the foregoing is merely examples, and the present disclosure is not limited thereto.

The starting position obtained according to the foregoing method is a column starting position, a row number of the starting position is 0, and a column number is $\lfloor k_0(i)/R_{subblock}^{TC}\rfloor$. That is, the starting position is a bit position with a row number of 0 in the virtual circular buffer.

The combining unit 804 stores demodulated soft bits of retransmitted coded data to the virtual circular buffer of the data block. That the combining unit 804 combines the coded data of the $i^{th}$ retransmission into the virtual circular buffer of the data block may be demodulating the received coded data of the $i^{th}$ retransmission to obtain demodulated soft bits of the $i^{th}$ retransmission, and adding, bit by bit from the starting position $k_0(i)$, the demodulated soft bits of the $i^{th}$ retransmission to demodulated soft bits that are accumulated in first i−1 times of retransmission and that are stored in the virtual circular buffer.

The decoding unit 805 is configured to decode combined data in the virtual circular buffer of the data block.

The decoding unit 805 decodes the combined data in the virtual circular buffer of the data block. Because the combined data stored in the virtual circular buffer is demodulated soft bits accumulated in the initial transmission and i times of retransmission, the decoding unit 805 decodes the demodulated soft bits accumulated in the initial transmission and the i times of retransmission in the virtual circular buffer.

Optionally, the transceiver unit 801 is further configured to: when the decoding unit 805 fails in decoding, send a NACK to the sending device, so that the sending device sends coded data of $(i+1)^{th}$ retransmission.

According to this embodiment of the present disclosure, the receiving device and the sending device maintain a transmission count of each retransmission, and determine a redundancy version of the retransmission by using the transmission count, so that the redundancy version may not be limited to four redundancy versions in the prior art. Therefore, a column starting position of coded data of each retransmission in the virtual circular buffer can be flexibly determined, and a requirement of a high transmission code rate is met.

Figure 9:
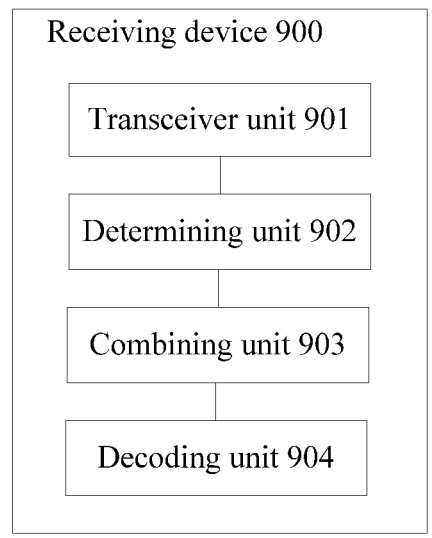
FIG. 9 is a structural diagram of a receiving device according to another embodiment of the present disclosure.

FIG. 9 is a structural diagram of a receiving device 900 according to another embodiment of the present disclosure. As shown in FIG. 9, the receiving device 900 includes a transceiver unit 901, a determining unit 902, a combining unit 903, and a decoding unit 904.

The transceiver unit 901 is configured to receive coded data of $i^{th}$ retransmission of a data block, where i is an integer greater than 0, and an upper value limit of i is a maximum quantity of retransmission times.

The determining unit 902 is configured to determine a starting position, in a virtual circular buffer of the data block, of the coded data of the $i^{th}$ retransmission that is received by the transceiver unit.

When i=1, the determining unit 902 determines a starting position $l_0(1)$ of coded data of first retransmission in the virtual circular buffer of the data block based on a starting position $l_0(0)$ of coded data of initial transmission in the virtual circular buffer of the data block and a quantity E(0) of bits of the coded data of the initial transmission; or when i>1, the determining unit 902 determines the starting position $l_0(i)$ of the coded data of the $i^{th}$ retransmission in the virtual circular buffer of the data block based on a starting position $l_0(i-1)$ of coded data of $(i-1)^{th}$ retransmission in the virtual circular buffer of the data block and a quantity E(i−1) of bits of the coded data of the $(i-1)^{th}$ retransmission, where the starting position $l_0(i)$ is a bit position of a coded data block in the virtual circular buffer.

The determining unit 902 may determine the starting position $l_0(i)$ of the coded data of the $i^{th}$ retransmission in the virtual circular buffer of the data block based on the following formula:

$$l_0(i)=l_0(i-1)+E(i-1), \text{ where}$$

if i=1, $l_0(i-1)$ is the starting position $l_0(0)=0$ of the coded data of the initial transmission of the data block in the virtual circular buffer of the data block, and E(0) is the quantity of bits of the coded data of the initial transmission; or if i>1, $l_0(i-1)$ is the starting position of the coded data of the $(i-1)^{th}$ retransmission in the virtual circular buffer of the data block, and $E(i-1)$ is the quantity of bits of the coded data of the $(i-1)^{th}$ retransmission that is received by the receiving device; and a row number of $l_0(i)$ in the virtual circular buffer is $l_0(i)$ % $R_{subblock}^{TC}$, and a column number is $\lfloor l_0(i)/R_{subblock}^{TC} \rfloor$; and $R_{subblock}^{TC}$ is a quantity of rows of the coded data block in the virtual circular buffer of the data block.

The combining unit 903 is configured to combine the coded data of the $i^{th}$ retransmission into the virtual circular buffer of the data block based on the starting position $l_0(i)$ determined by the determining unit 902.

That the combining unit 903 combines the coded data of the $i^{th}$ retransmission into the virtual circular buffer of the data block may be demodulating the received coded data of the $i^{th}$ retransmission to obtain demodulated soft bits of the $i^{th}$ retransmission, and adding, bit by bit from the starting position $l_0(i)$, the demodulated soft bits of the $i^{th}$ retransmission to demodulated soft bits that are accumulated in first i−1 times of retransmission and that are stored in the virtual circular buffer.

The decoding unit 904 is configured to decode the virtual circular buffer of the data block.

The decoding unit 904 decodes combined data in the virtual circular buffer of the data block. Because the combined data stored in the virtual circular buffer is demodulated soft bits accumulated in the initial transmission and i times of retransmission, the decoding unit 904 decodes the demodulated soft bits accumulated in the initial transmission and the i times of retransmission in the virtual circular buffer.

Optionally, the transceiver unit 901 is further configured to: when the decoding unit 904 fails in decoding, send a NACK to a sending device, so that the sending device sends coded data of $(i+1)^{th}$ retransmission.

This embodiment of the present disclosure is suitable for a scenario in which a retransmission granularity is bits. The receiving device and the sending device determine a starting position of coded data of current transmission in the virtual circular buffer based on a starting position and a quantity of transmitted bits of previous transmission, so that a starting position of coded data of each retransmission in the virtual circular buffer can be flexibly determined, and a requirement of a higher transmission code rate is met.

Figure 10:
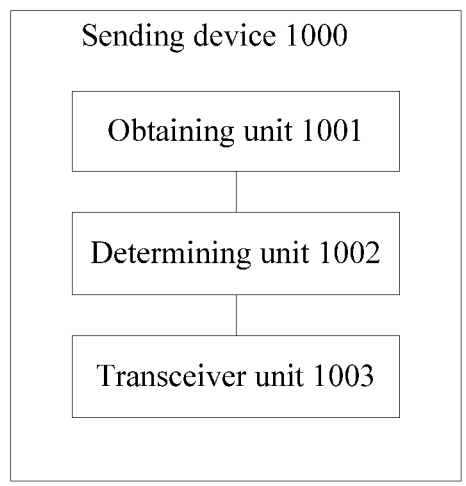
FIG. 10 is a structural diagram of a sending device according to another embodiment of the present disclosure.

FIG. 10 is a structural diagram of a sending device 1000 according to another embodiment of the present disclosure. As shown in FIG. 10, the sending device 1000 includes an obtaining unit 1001, a determining unit 1002, and a transceiver unit 1003.

The obtaining unit 1001 is configured to obtain a transmission count RvCnt(i) of $i^{th}$ retransmission, where i is an integer greater than 0, and an upper value limit of i is a maximum quantity of retransmission times.

In an embodiment of the present disclosure, a receiving device and the sending device may separately maintain a transmission count of a HARQ process according to an agreed rule. For example, the obtaining unit 1001 may obtain the transmission count RvCnt(i) of the $i^{th}$ retransmission based on RvCnt(i)=RvCnt(i−1)+1. It should be noted that the present disclosure is not limited thereto. The obtaining unit 1001 may alternatively obtain the transmission count RvCnt(i) of the $i^{th}$ retransmission according to another agreed rule.

In another embodiment of the present disclosure, one end that schedules data may determine the transmission count RvCnt(i) of the $i^{th}$ retransmission, and notify the other end by using scheduling information. For example, when the sending device is a base station, the obtaining unit 1001 may determine the transmission count RvCnt(i) of the $i^{th}$ retransmission based on RvCnt(i)=RvCnt(i−1)+b+$c_{offset}$, and the transceiver unit 1003 is configured to send scheduling information, and notify a terminal of the transmission count of the $i^{th}$ retransmission by using the scheduling information. A value range of $c_{offset}$ is −2, −1, or 0, and $c_{offset}$ is pre-configured by a system; b is an integer ranging from 0 to 3, and a value of b may be determined by the obtaining unit 1001 during each retransmission, to ensure that RvCnt(i) is not a negative number. In this manner, b+$c_{offset}$ actually represents an increment of RvCnt(i), and may be a positive number or a negative number. When b+$c_{offset}$ is a negative number, b+$c_{offset}$ represents that a previous transmission count is retransmitted, so that an objective of flexible control is achieved. For another example, when the sending device is a terminal, the transceiver unit 1003 is configured to receive scheduling information, and the obtaining unit 1001 may obtain the transmission count RvCnt(i) of the $i^{th}$ retransmission by using the scheduling information. In the foregoing manner, to reduce a data volume of air interface transmission, only an information bit, such as latter two bits, of RvCnt(i) may be transmitted by using the scheduling information. After obtaining the information bit of RvCnt(i), the obtaining unit 1001 obtains the transmission count RvCnt(i) of the $i^{th}$ retransmission through recovery based on the information bit of RvCnt(i). Because the information bit of RvCnt(i) is in a relatively small quantity, a new field may be added to the scheduling information to send the information bit, or an MCS field may be reused to send the information bit, or a redundancy version field may be used to send the information bit. It should be noted that the foregoing is merely examples, and the present disclosure is not limited thereto.

The determining unit 1002 is configured to determine a redundancy version Rv(i) of the $i^{th}$ retransmission based on the transmission count RvCnt(i) of the $i^{th}$ retransmission obtained by the obtaining unit 1001.

The redundancy version Rv(i) of the $i^{th}$ retransmission is determined based on the transmission count RvCnt(i) of the $i^{th}$ retransmission. This has been described in step 103 in the foregoing method embodiment, and details are not described herein again.

The transceiver unit 1003 is configured to obtain coded data of the $i^{th}$ retransmission from a virtual circular buffer of a data block based on the redundancy version Rv(i) of the $i^{th}$ retransmission determined by the determining unit 1002, and send the coded data of the $i^{th}$ retransmission to the receiving device.

A starting position $k_0(i)$ of the coded data of the $i^{th}$ retransmission in the virtual circular buffer of the data block is determined based on the redundancy version Rv(i) of the $i^{th}$ retransmission, and the coded data of the $i^{th}$ retransmission is obtained from the virtual circular buffer of the data block based on the starting position $k_0(i)$. This has been described in step 104 in the foregoing method embodiment, and details are not described herein again.

According to this embodiment of the present disclosure, the receiving device and the sending device maintain a transmission count of each retransmission, and determine a redundancy version of the retransmission by using the transmission count, so that the redundancy version may not be limited to four redundancy versions in the prior art. Therefore, a column starting position of coded data of each retransmission in the virtual circular buffer can be flexibly determined, and a requirement of a high transmission code rate is met.

Figure 11:
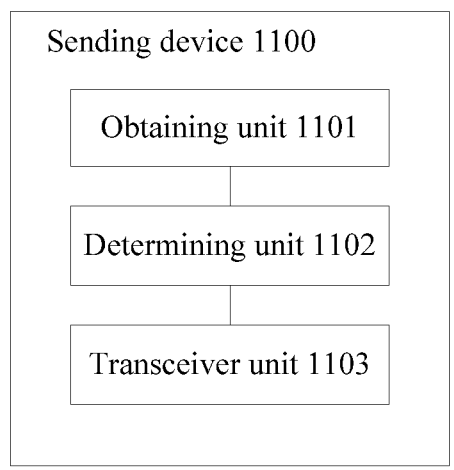
FIG. 11 is a structural diagram of a sending device according to another embodiment of the present disclosure.

FIG. 11 is a structural diagram of a sending device 1100 according to another embodiment of the present disclosure. As shown in FIG. 11, the sending device 1100 includes an obtaining unit 1101, a determining unit 1102, and a transceiver unit 1103.

The obtaining unit 1101 is configured to obtain a starting position $l_0(i-1)$ of coded data of $(i-1)^{th}$ transmission in a virtual circular buffer of a data block and a quantity $E(i-1)$ of bits of the coded data of the $(i-1)^{th}$ transmission, where i is an integer greater than 0.

When i=1, the coded data of the $(i-1)^{th}$ transmission is a data block of initial transmission; or when i>1, the coded data of the $(i-1)^{th}$ transmission is a data block of retransmission.

The determining unit 1102 is configured to determine a starting position $l_0(i)$ of coded data of $i^{th}$ transmission in the virtual circular buffer based on the starting position $l_0(i-1)$ of the coded data of the $(i-1)^{th}$ transmission in the virtual circular buffer of the data block and the quantity $E(i-1)$ of bits of the coded data of the $(i-1)^{th}$ transmission that are obtained by the obtaining unit 1101.

The starting position $l_0(i)$ of the coded data of the $i^{th}$ transmission in the virtual circular buffer is determined based on the starting position $l_0(i-1)$ of the coded data of the $(i-1)^{th}$ transmission in the virtual circular buffer of the data block and the quantity $E(i-1)$ of bits of the coded data of the $(i-1)^{th}$ transmission that are obtained. This has been described in step 202 in the foregoing method embodiment, and details are not described herein again.

The transceiver unit 1103 is configured to obtain the coded data of the $i^{th}$ transmission based on the starting position $l_0(i)$, determined by the determining unit 1102, of the coded data of the $i^{th}$ transmission in the virtual circular buffer, and send the coded data of the $i^{th}$ transmission to a receiving device.

This embodiment of the present disclosure is suitable for a scenario in which a retransmission granularity is bits. The receiving device and the sending device determine a starting position of coded data of current transmission in the virtual circular buffer based on a starting position and a quantity of transmitted bits of previous transmission, so that a starting position of coded data of each retransmission in the virtual circular buffer can be flexibly determined, and a requirement of a higher transmission code rate is met.

Figure 12:
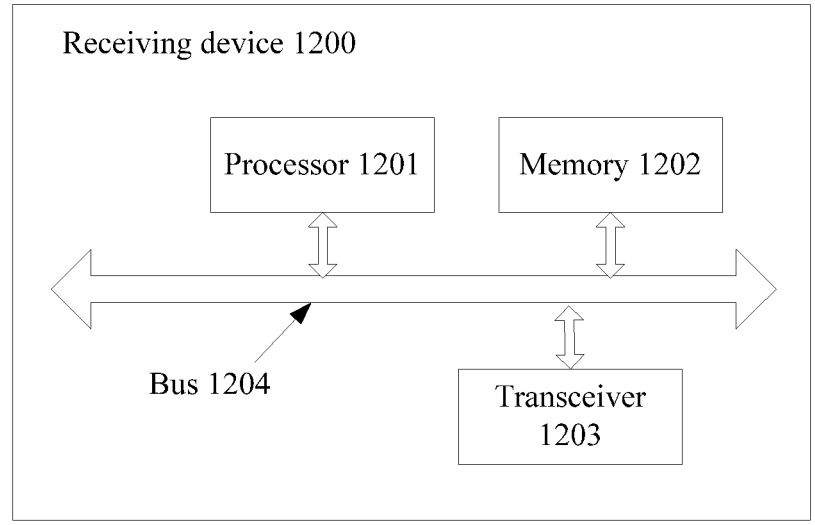
FIG. 12 is a structural diagram of a receiving device according to another embodiment of the present disclosure.

FIG. 12 is a structural diagram of a receiving device 1200 according to another embodiment of the present disclosure. As shown in FIG. 12, the receiving device 1200 includes a processor 1201, a memory 1202, and a transceiver 1203 that are connected to and communicate with each other in a linear structure, a star structure, or the like by using one or more buses 1204. The memory 1202 stores a set of program codes, and the memory 1202 may include a non-volatile memory. The processor 1201 may be a central processing unit (CPU), or an application specific integrated circuit (ASIC), or is configured as one or more integrated circuits for implementing the embodiments of the present disclosure. By using the bus 1204, the processor 1201 controls the transceiver 1203 to receive or send a message, and calls the set of program codes stored in the memory 1202, to control the transceiver 1203 to receive coded data of $i^{th}$ retransmission of a data block, where i is an integer greater than 0, and an upper limit of i is a maximum quantity of retransmission times;

obtain a transmission count RvCnt(i) of the $i^{th}$ retransmission;

determine a redundancy version Rv(i) of the $i^{th}$ retransmission based on the obtained transmission count RvCnt(i) of the $i^{th}$ retransmission;

combine the coded data of the $i^{th}$ retransmission into a virtual circular buffer of the data block based on the determined redundancy version Rv(i) of the $i^{th}$ retransmission; and decode combined data in the virtual circular buffer of the data block.

It should be noted that, for a technical solution specifically implemented by the processor 1201 by calling the program code stored in the memory 1202, refer to the foregoing method embodiments, and implementation principles and technical effects of this embodiment are similar to those of the foregoing embodiments. Refer to related description of the foregoing embodiments for details, and the details are not described herein again.

Figure 13:
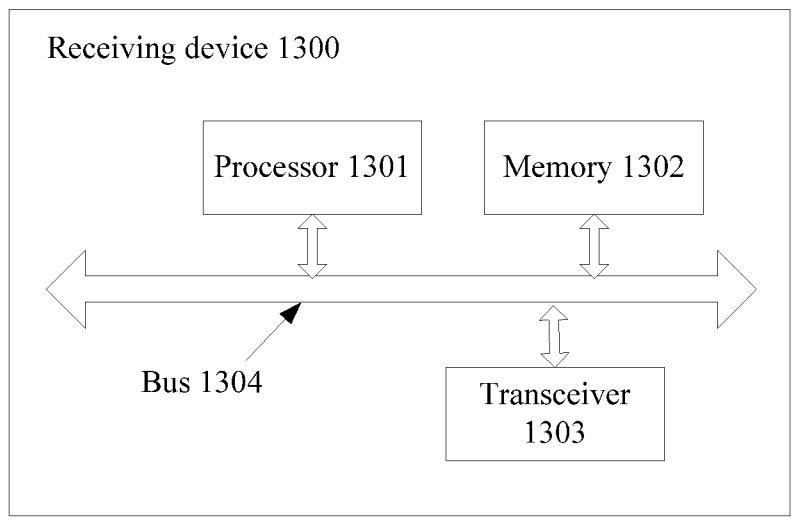
FIG. 13 is a structural diagram of a receiving device according to another embodiment of the present disclosure.

FIG. 13 is a structural diagram of a receiving device 1300 according to another embodiment of the present disclosure. As shown in FIG. 13, the receiving device 1300 includes a processor 1301, a memory 1302, and a transceiver 1303 that are connected to and communicate with each other in a linear structure, a star structure, or the like by using one or more buses 1304. The memory 1302 stores a set of program code, and the memory 1302 may include a non-volatile memory. The processor 1301 may be a central processing unit (CPU), or an application specific integrated circuit (ASIC), or is configured as one or more integrated circuits for implementing the embodiments of the present disclosure. By using the bus 1304, the processor 1301 controls the transceiver 1303 to receive or send a message, and calls a program stored in the memory 1302, to control the transceiver 1403 to receive coded data of $i^{th}$ retransmission of a data block, where i is an integer greater than 0;

when i=1, determine a starting position $l_0(1)$ of coded data of first retransmission in a virtual circular buffer of the data block based on a starting position $l_0(0)$ of coded data of initial transmission in the virtual circular buffer of the data block and a quantity $E(0)$ of bits of the coded data of the initial transmission; or when i>1, determine a starting position $l_0(i)$ of the coded data of the $i^{th}$ retransmission in a virtual circular buffer of the data block based on a starting position $l_0(i-1)$ of coded data of $(i-1)^{th}$ retransmission in the virtual circular buffer of the data block and a quantity $E(i-1)$ of bits of the coded data of the $(i-1)^{th}$ retransmission, where the starting position $l_0(i)$ is a bit position of a coded data block in the virtual circular buffer;

combine the received coded data of the $i^{th}$ retransmission into the virtual circular buffer of the data block based on the determined starting position $l_0(i)$; and decode combined data in the virtual circular buffer of the data block.

It should be noted that, for a technical solution specifically implemented by the processor 1301 by calling the program code stored in the memory 1302, refer to the foregoing method embodiments, and implementation principles and technical effects of this embodiment are similar to those of the foregoing embodiment. Refer to related description of the foregoing embodiments for details, and the details are not described herein again.

Figure 14:
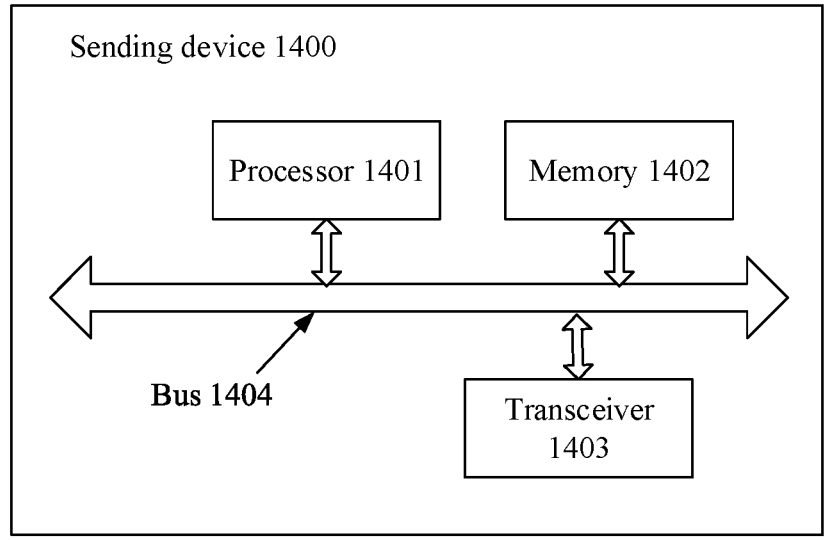
FIG. 14 is a structural diagram of a sending device according to another embodiment of the present disclosure.

FIG. 14 is a structural diagram of a sending device 1400 according to another embodiment of the present disclosure. As shown in FIG. 14, the sending device 1400 includes a processor 1401, a memory 1402, and a transceiver 1403 that are connected to and communicate with each other in a linear structure, a star structure, or the like by using one or more buses 1404. The memory 1402 stores a set of program code, and the memory 1402 may include a non-volatile memory. The processor 1401 may be a central processing unit (CPU), or an application specific integrated circuit (ASIC), or is configured as one or more integrated circuits for implementing the embodiments of the present disclosure. By using the bus 1404, the processor 1401 controls the transceiver 1403 to receive or send a message, and calls a program stored in the memory 1402, to obtain a transmission count RvCnt(i) of $i^{th}$ retransmission, where i is an integer greater than 0, and an upper value limit of i is a maximum quantity of retransmission times;

determine a redundancy version Rv(i) of the $i^{th}$ retransmission based on the obtained transmission count RvCnt(i) of the $i^{th}$ retransmission;

obtain coded data of the $i^{th}$ retransmission from a virtual circular buffer of a data block based on the determined redundancy version Rv(i) of the $i^{th}$ retransmission; and control the transceiver 1403 to send the coded data of the $i^{th}$ retransmission to a receiving device.

It should be noted that, for a technical solution specifically implemented by the processor 1401 by calling the program code stored in the memory 1402, refer to the foregoing method embodiments, and implementation principles and technical effects of this embodiment are similar to those of the foregoing embodiments. Refer to related description of the foregoing embodiments for details, and the details are not described herein again.

Figure 15:
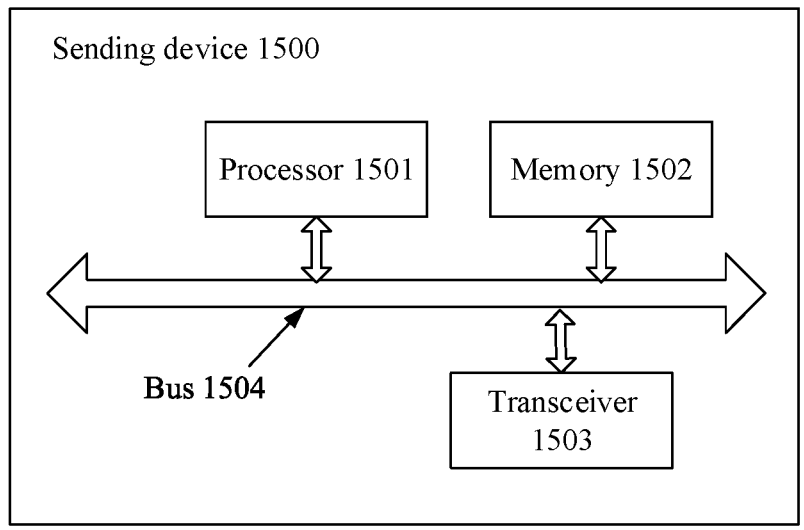
FIG. 15 is a structural diagram of a sending device according to another embodiment of the present disclosure.

FIG. 15 is a structural diagram of a sending device 1500 according to another embodiment of the present disclosure. As shown in FIG. 15, the sending device 1500 includes a processor 1501, a memory 1502, and a transceiver 1503 that are connected to and communicate with each other in a linear structure, a star structure, or the like by using one or more buses 1504. The memory 1502 stores a set of program code, and the memory 1502 may include a non-volatile memory. The processor 1501 may be a central processing unit (CPU), or an application specific integrated circuit (ASIC), or is configured as one or more integrated circuits for implementing the embodiments of the present disclosure. By using the bus 1504, the processor 1501 controls the transceiver 1503 to receive or send a message, and calls a program stored in the memory 1502, to obtain a starting position $l_0(i-1)$ of coded data of $(i-1)^{th}$ transmission in a virtual circular buffer of a data block and a quantity $E(i-1)$ of bits of the coded data of the $(i-1)^{th}$ transmission, where i is an integer greater than 0;

determine a starting position $l_0(i)$ of coded data of $i^{th}$ transmission in the virtual circular buffer based on the starting position $l_0(i-1)$ of the coded data of the $(i-1)^{th}$ transmission in the virtual circular buffer of the data block and the quantity $E(i-1)$ of bits of the coded data of the $(i-1)^{th}$ transmission that are obtained;

obtain the coded data of the $i^{th}$ transmission based on the determined starting position $l_0(i)$ of the coded data of the $i^{th}$ transmission in the virtual circular buffer; and control the transceiver 1503 to send the coded data of the $i^{th}$ retransmission to a receiving device.

It should be noted that, for a technical solution specifically implemented by the processor 1501 by calling the program code stored in the memory 1502, refer to the foregoing method embodiments, and implementation principles and technical effects of this embodiment are similar to those of the foregoing embodiments. Refer to related description of the foregoing embodiments for details, and the details are not described herein again.

Figure 16:
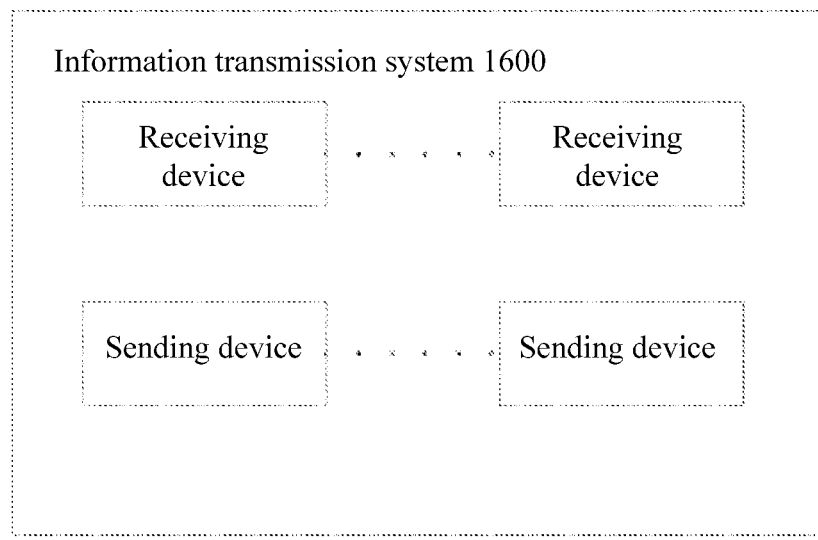
FIG. 16 is a schematic networking diagram of an information transmission system according to another embodiment of the present disclosure.

FIG. 16 is a schematic networking diagram of an information transmission system 1600 according to another embodiment of the present disclosure. As shown in FIG. 16, the system 1600 includes at least one receiving device and at least one sending device.

The receiving device may be the receiving device 800 shown in FIG. 8 or the receiving device 1200 shown in FIG. 12, and the sending device may be the sending device 1000 shown in FIG. 10 or the sending device 1400 shown in FIG. 14; or the receiving device may be the receiving device 900 shown in FIG. 9 or the receiving device 1300 shown in FIG. 13, and the sending device may be the sending device 1100 shown in FIG. 11 or the sending device 1500 shown in FIG. 15.

Because description has been provided in the foregoing embodiments, and implementation principles and technical effects of this embodiment are similar to those of the foregoing embodiments. Refer to related description of the foregoing embodiments for details, and the details are not described herein again.

In the foregoing embodiments, the description of each embodiment has respective focuses. For a part that is not described in detail in an embodiment, refer to related description in other embodiments.

It may be clearly understood by a person skilled in the art that, for ease of description and brevity, reference may be made to a corresponding process in the foregoing method embodiments for a detailed working process of the foregoing system, sending device, and receiving device, and details are not described herein again.

In the several embodiments provided in this application, it should be understood that the disclosed system, sending device, receiving device, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

With description of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium.

The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another optical disc storage, a disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure include a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. An information transmission method, wherein the method comprises:
receiving, by a receiving device, coded data of $i^{th}$ retransmission of a data block, wherein i is an integer greater than 0;
obtaining, by the receiving device, a transmission count RvCnt(i) of the $i^{th}$ retransmission;
determining, by the receiving device, a redundancy version Rv(i) of the $i^{th}$ retransmission based on the transmission count RvCnt(i) of the $i^{th}$ retransmission;
combining, by the receiving device, the coded data of the $i^{th}$ retransmission into a virtual circular buffer of the data block based on the redundancy version Rv(i) of the $i^{th}$ retransmission; and
decoding, by the receiving device, combined data in the virtual circular buffer of the data block, wherein the receiving device is a base station, and the obtaining, by the receiving device, a transmission count RvCnt(i) of the $i^{th}$ retransmission comprises: obtaining, by the base station, the transmission count RvCnt(i) of the $i^{th}$ retransmission in the following manner:

$$RvCnt(i)=RvCnt(i-1)+1; \text{ or}$$

$$RvCnt(i)=RvCnt(i-1)+b+c_{offset},$$

wherein b is an integer ranging from 0 to 3, and a value of $C_{offset}$ is −2, −1, or 0.

2. The method according to claim 1, wherein the method further comprises:
sending, by the base station, scheduling information to a terminal, wherein the scheduling information comprises an information bit of the transmission count RvCnt(i) of the $i^{th}$ retransmission.

3. The method according to claim 2, wherein
the scheduling information comprises a field for the information bit of the transmission count RvCnt(i) of the $i^{th}$ retransmission; or
the scheduling information comprises a modulation and coding scheme (MCS) field for the information bit of the transmission count RvCnt(i) of the $i^{th}$ retransmission; or
the scheduling information comprises a redundancy version field for the information bit of the transmission count RvCnt(i) of the $i^{th}$ retransmission.

4. An information transmission method, wherein the method comprises:
receiving, by a receiving device, coded data of $i^{th}$ retransmission of a data block, wherein i is an integer greater than 0;
obtaining, by the receiving device, a transmission count RvCnt(i) of the $i^{th}$ retransmission;
determining, by the receiving device, a redundancy version Rv(i) of the $i^{th}$ retransmission based on the transmission count RvCnt(i) of the $i^{th}$ retransmission;
combining, by the receiving device, the coded data of the $i^{th}$ retransmission into a virtual circular buffer of the data block based on the redundancy version Rv(i) of the $i^{th}$ retransmission; and
decoding, by the receiving device, combined data in the virtual circular buffer of the data block, wherein the receiving device is a terminal, and the obtaining, by the receiving device, a transmission count RvCnt(i) of the $i^{th}$ retransmission comprises:
obtaining, by the terminal, the transmission count RvCnt(i) of the $i^{th}$ retransmission based on RvCnt(i)=RvCnt(i−1)+1; or
receiving, by the terminal, scheduling information sent by a base station,
obtaining, by the terminal, an information bit of the transmission count RvCnt(i) of the $i^{th}$ retransmission from the scheduling information, and
obtaining, by the terminal, the transmission count RvCnt(i) of the $i^{th}$ retransmission based on the information bit of the transmission count RvCnt(i) of the $i^{th}$ retransmission.

5. The method according to claim 4, wherein
the scheduling information comprises a field for the information bit of the transmission count RvCnt(i) of the $i^{th}$ retransmission; or
the scheduling information comprises a modulation and coding scheme (MCS) field for the information bit of the transmission count RvCnt(i) of the $i^{th}$ retransmission; or
the scheduling information comprises a redundancy version field for the information bit of the transmission count RvCnt(i) of the $i^{th}$ retransmission.

6. An information transmission method, wherein the method comprises:
receiving, by a receiving device, coded data of $i^{th}$ retransmission of a data block, wherein i is an integer greater than 0;
obtaining, by the receiving device, a transmission count RvCnt(i) of the $i^{th}$ retransmission;
determining, by the receiving device, a redundancy version Rv(i) of the $i^{th}$ retransmission based on the transmission count RvCnt(i) of the $i^{th}$ retransmission;

combining, by the receiving device, the coded data of the $i^{th}$ retransmission into a virtual circular buffer of the data block based on the redundancy version Rv(i) of the $i^{th}$ retransmission; and decoding, by the receiving device, combined data in the virtual circular buffer of the data block, wherein the determining, by the receiving device, a redundancy version Rv(i) of the $i^{th}$ retransmission based on the transmission count RvCnt(i) of the $i^{th}$ retransmission comprises: determining, by the receiving device, the redundancy version Rv(i) of the $i^{th}$ retransmission in the following manners:

$$Rv(i)=(Rv(i-1)+\text{round}((RvCnt(i)-RvCnt(i-1))\cdot 1/(Rate(i-1)\cdot 3.0)\cdot N_{rv})\% N_{rv})\% N_{rv}; \text{ or}$$

$$Rv(i)=(Rv(i-1)+\lfloor (RvCnt(i)-RvCnt(i-1))\cdot 1/(Rate(i-1)\cdot 3.0)\cdot N_{rv}\rfloor \% N_{rv})\% N_{rv}; \text{ or}$$

$$Rv(i)=(Rv(i-1)+\lceil (RvCnt(i)-RvCnt(i-1))\cdot 1/(Rate(i-1)\cdot 3.0)\cdot N_{rv}\rceil \% N_{rv})\% N_{rv}, \text{ wherein}$$

if i=1, Rv(0) is a redundancy version of initial transmission of the data block, RvCnt(0) is a transmission count of the initial transmission, and is initially 0, and Rate(0) is a transmission code rate of the initial transmission; or if i>1, Rv(i−1) is a redundancy version of $(i-1)^{th}$ retransmission, RvCnt(i−1) is a transmission count of the $(i-1)^{th}$ retransmission, and Rate(i−1) is a transmission code rate of the $(i-1)^{th}$ retransmission; and $N_{rv}$ is a quantity of redundancy versions; round(•) represents rounding off; % represents performing modulo operation; $\lceil • \rceil$ represents rounding up; and $\lfloor • \rfloor$ represents rounding down.

7. The method according to claim 6, wherein the combining, by the receiving device, the coded data of the $i^{th}$ retransmission into a virtual circular buffer of the data block based on the redundancy version Rv(i) of the $i^{th}$ retransmission comprises:

determining, by the receiving device, a starting position $k_0(i)$ of the coded data of the $i^{th}$ retransmission in the virtual circular buffer of the data block based on the following formula:

$$k_0(i)=R_{subblock}^{TC}\cdot ((2\cdot \lceil N_{cb}/(2\cdot N_{rv}\cdot R_{subblock}^{TC})\rceil \cdot Rv(i)+a)\% (3\cdot C_{subblock}^{TC}); \text{ and}$$

combining, by the receiving device, the coded data of the $i^{th}$ retransmission into the virtual circular buffer of the data block based on $k_0(i)$, wherein $R_{subblock}^{TC}$ block is a quantity of rows of a coded data block of the data block in the virtual circular buffer of the data block; $N_{cb}$ is a quantity of bits of the coded data block in the virtual circular buffer of the data block; $C_{subblock}^{TC}$ equals 32, and is a quantity of columns of the coded data block in the virtual circular buffer of the data block; $N_{rv}$ is the quantity of redundancy versions and ranges from 4 to $3\cdot C_{subblock}^{TC}$; a is an offset ranging from 0 to $C_{subblock}^{TC}-1$; % represents performing modulo operation; and $\lceil • \rceil$ represents rounding up.

8. A device, comprising:
a processor; and
a non-transitory computer-readable storage medium coupled to the processor and storing programming instructions for execution by the processor, the programming instructions instruct the processor to:
receive coded data of $i^{th}$ retransmission of a data block, wherein i is an integer greater than 0;
obtain a transmission count RvCnt(i) of the $i^{th}$ retransmission;

determine a redundancy version Rv(i) of the $i^{th}$ retransmission based on the transmission count RvCnt(i) of the $i^{th}$ retransmission obtained by the obtaining unit;

combine the coded data of the $i^{th}$ retransmission into a virtual circular buffer of the data block based on the redundancy version Rv(i) of the $i^{th}$ retransmission determined by the determining unit; and decode combined data in the virtual circular buffer of the data block, wherein the programming instructions instruct the processor to obtain the transmission count RvCnt(i) of the $i^{th}$ retransmission in the following manner:

$$RvCnt(i)=RvCnt(i-1)+1; \text{ or}$$

$$RvCnt(i)=RvCnt(i-1)+b+c_{offset},$$

wherein b is an integer ranging from 0 to 3, and a value of $C_{offset}$ is −2, −1, or 0.

9. The device according to claim 8, wherein the device is in a base station.

10. The device according to claim 8, wherein the programming instructions instruct the processor to send scheduling information, wherein the scheduling information comprises an information bit of the transmission count RvCnt(i) of the $i^{th}$ retransmission.

11. The device according to claim 8, wherein the device is in a terminal.

12. The device according to claim 10, wherein
the scheduling information comprises a field for the information bit of the transmission count RvCnt(i) of the $i^{th}$ retransmission; or the scheduling information comprises a modulation and coding scheme (MCS) field for the information bit of the transmission count RvCnt(i) of the $i^{th}$ retransmission; or the scheduling information comprises a redundancy version field for the information bit of the transmission count RvCnt(i) of the $i^{th}$ retransmission.

13. A device, comprising:
a processor; and
a non-transitory computer-readable storage medium coupled to the processor and storing programming instructions for execution by the processor, the programming instructions instruct the processor to:
receive coded data of $i^{th}$ retransmission of a data block, wherein i is an integer greater than 0;
obtain a transmission count RvCnt(i) of the $i^{th}$ retransmission;
determine a redundancy version Rv(i) of the $i^{th}$ retransmission based on the transmission count RvCnt(i) of the $i^{th}$ retransmission obtained by the obtaining unit;
combine the coded data of the $i^{th}$ retransmission into a virtual circular buffer of the data block based on the redundancy version Rv(i) of the $i^{th}$ retransmission determined by the determining unit; and
decode combined data in the virtual circular buffer of the data block, wherein the programming instructions instruct the processor to:
obtain the transmission count RvCnt(i) of the $i^{th}$ retransmission based on RvCnt(i)=RvCnt(i−1)+1; or
receive scheduling information, and
obtain an information bit of the transmission count RvCnt(i) of the $i^{th}$ retransmission from the scheduling information, and obtain the transmission count RvCnt(i) of the $i^{th}$ retransmission based on the information bit of the transmission count RvCnt(i) of the $i^{th}$ retransmission.

14. The device according to claim 13, wherein
the scheduling information comprises a field for the information bit of the transmission count RvCnt(i) of the $i^{th}$ retransmission; or the scheduling information comprises a modulation and coding scheme (MCS) field for the information bit of the transmission count RvCnt(i) of the $i^{th}$ retransmission; or the scheduling information comprises a redundancy version field for the information bit of the transmission count RvCnt(i) of the $i^{th}$ retransmission.

15. A device, comprising:
a processor; and
a non-transitory computer-readable storage medium coupled to the processor and storing programming instructions for execution by the processor, the programming instructions instruct the processor to:

receive coded data of $i^{th}$ retransmission of a data block, wherein i is an integer greater than 0;

obtain a transmission count RvCnt(i) of the $i^{th}$ retransmission;

determine a redundancy version Rv(i) of the $i^{th}$ retransmission based on the transmission count RvCnt(i) of the $i^{th}$ retransmission obtained by the obtaining unit;

combine the coded data of the $i^{th}$ retransmission into a virtual circular buffer of the data block based on the redundancy version Rv(i) of the $i^{th}$ retransmission determined by the determining unit; and decode combined data in the virtual circular buffer of the data block, wherein the programming instructions instruct the processor to determine the redundancy version Rv(i) of the $i^{th}$ retransmission in the following manners:

$Rv(i)=(Rv(i-1)+\text{round}((RvCnt(i)-RvCnt(i-1))\cdot 1/(Rate(i-1)\cdot 3.0)\cdot N_{rv})\% N_{rv})\% N_{rv}$; or $Rv(i)=(Rv(i-1)+\lfloor(RvCnt(i)-RvCnt(i-1))\cdot 1/(Rate(i-1)\cdot 3.0)\cdot N_{rv}\rfloor\% N_{rv})\% N_{rv}$; or $Rv(i)=(Rv(i-1)+\lceil(RvCnt(i)-RvCnt(i-1))\cdot 1/(Rate(i-1)\cdot 3.0)\cdot N_{rv}\rceil\% N_{rv})\% N_{rv}$, wherein if i=1, Rv(0) is a redundancy version of initial transmission of the data block, RvCnt(0) is a transmission count of the initial transmission, and is initially 0, and Rate(0) is a transmission code rate of the initial transmission; or if i>1, Rv(i−1) is a redundancy version of $(i-1)^{th}$ retransmission, RvCnt(i−1) is a transmission count of the $(i-1)^{th}$ retransmission, and Rate(i−1) is a transmission code rate of the $(i-1)^{th}$ retransmission; and $N_{rv}$ is a quantity of redundancy versions; round(•) represents rounding off; % represents performing modulo operation; $\lceil • \rceil$ represents rounding up; and $\lfloor • \rfloor$ represents rounding down.

16. The device according to claim 15, wherein the programming instructions instruct the processor to:

determine a starting position $k_0(i)$ of the coded data of the $i^{th}$ retransmission in the virtual circular buffer of the data block based on the following formula:

$k_0(i)=R_{subblock}^{TC}\cdot((2\cdot\lceil N_{cb}/(2\cdot N_{rv}\cdot R_{subblock}^{TC})\rceil\cdot Rv(i)+a)\%(3\cdot C_{subblock}^{TC})$; and combine the coded data of the $i^{th}$ retransmission into the virtual circular buffer of the data block based on $k_0(i)$, wherein $R_{subblock}^{TC}$ is a quantity of rows of a coded data block in the virtual circular buffer of the data block; $N_{cb}$ is a quantity of bits of the coded data block in the virtual circular buffer of the data block; $C_{subblock}^{TC}$ equals 32, and is a quantity of columns of the coded data block in the virtual circular buffer of the data block; $N_{rv}$ is the quantity of redundancy versions and ranges from 4 to $3\cdot C_{subblock}^{TC}$; a is an offset ranging from 0 to $C_{subblock}^{TC}-1$; % represents performing modulo operation; and $\lceil • \rceil$ represents rounding up.

* * * * *